United States Patent [19]

Seike et al.

[11] Patent Number: 5,069,525

[45] Date of Patent: Dec. 3, 1991

[54] OPTICAL FIBER BUILT-IN TYPE COMPOSITE INSULATOR AND METHOD OF PRODUCING THE SAME

[75] Inventors: Shoji Seike, Nagoya; Koichi Mori, Handa; Mitsuji Ikeda, Nagoya; Masayuki Nozaki, Aichi; Hisakazu Okajima, Nagoya; Hiroyuki Katsukawa, Aichi; Kazumi Nakanishi, Inuyama; Kenji Doi, Nagoya, all of Japan

[73] Assignee: NGK Insulators, Ltd., Japan

[21] Appl. No.: 421,848

[22] Filed: Oct. 16, 1989

[30] Foreign Application Priority Data

Oct. 14, 1988 [JP] Japan ................................. 63-257366
Oct. 14, 1988 [JP] Japan ................................. 63-257367
Mar. 23, 1989 [JP] Japan ................................. 1-71332
Mar. 23, 1989 [JP] Japan ................................. 1-71333
Mar. 24, 1989 [JP] Japan ................................. 1-73621

[51] Int. Cl.$^5$ .............................................. G02B 6/44
[52] U.S. Cl. .................................. 385/100; 174/139; 385/123; 385/134
[58] Field of Search ............... 350/96.10, 96.20, 96.23; 174/139

[56] References Cited

U.S. PATENT DOCUMENTS 4,613,727  9/1986  Salanki et al. .................. 174/139 X
4,653,846  3/1987  Yamazaki et al. ................. 350/96.2
4,810,836  3/1989  Shinoda et al. ..................... 174/139
4,833,278  5/1989  Lambeth ............................ 174/139
4,919,217  4/1990  Mima et al. ........................ 174/139
4,921,322  5/1990  Seike et al. ........................ 350/96.2

FOREIGN PATENT DOCUMENTS 63-194303  12/1988  Japan .................................. 174/139

Primary Examiner—William L. Sikes
Assistant Examiner—Phan T. Heartney
Attorney, Agent, or Firm—Parkhurst, Wendel & Rossi

[57] ABSTRACT

An excellent optical fiber built-in type composite insulator including at least two insulator bodies each having a penetration bore, at least one optical fiber inserted in the penetration bores, and sealing structures for the penetration bores of the insulator bodies and for a joining layer of opposing end surfaces of adjacent insulator bodies, is provided, which effectively prevents leakage of inner silicone grease, bending and breakage of the optical fiber, leakage of electric current along the penetration bores, short circuited trouble, and destruction of the insulator bodies, improves joining strength of the opposing end surfaces of the insulator bodies, and maintains the joining strength for a long period, affords a change of numbers of the insulator bodies, and facilitates the production. A method of producing such composite insulator is also provided.

14 Claims, 21 Drawing Sheets

FIG_4a
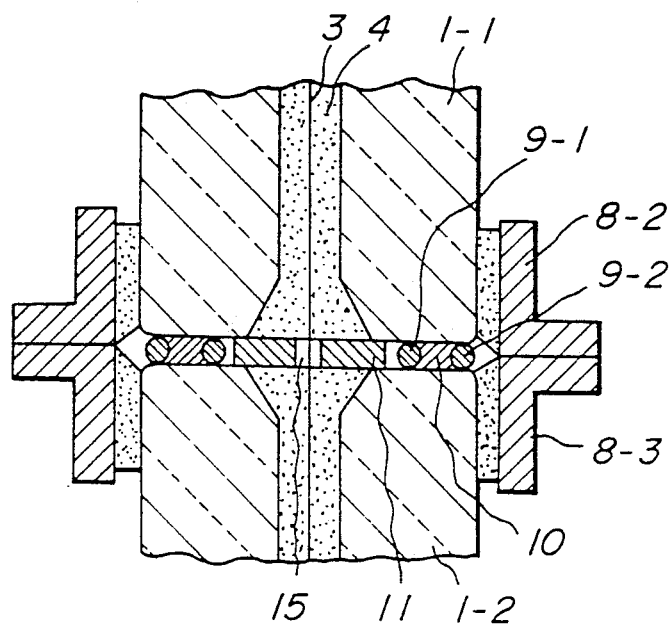
FIG_4b
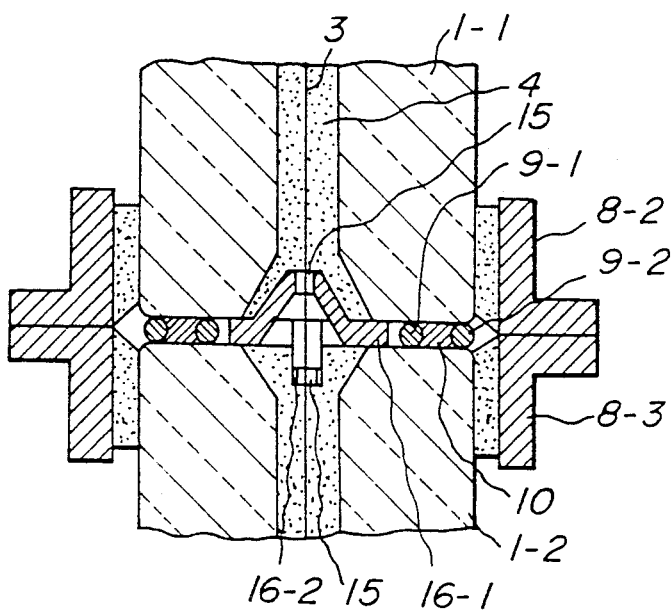

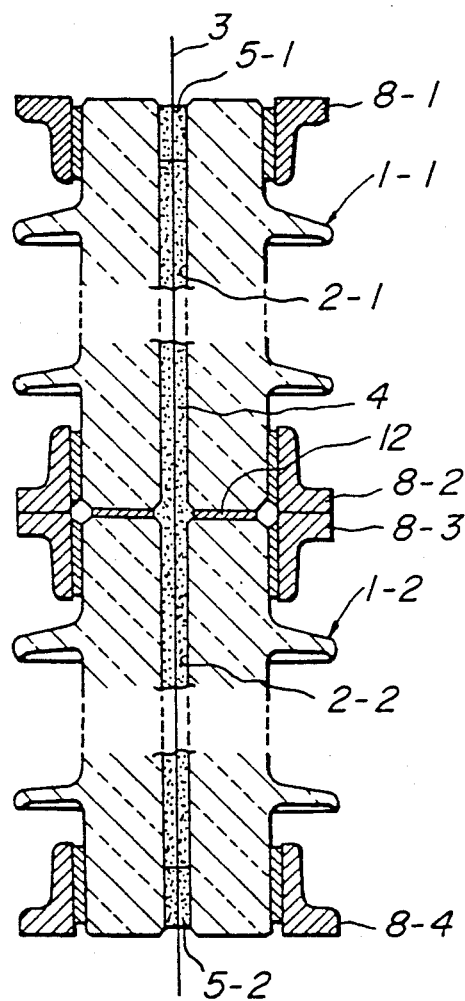
FIG_5
PRIOR ART

FIG_7a
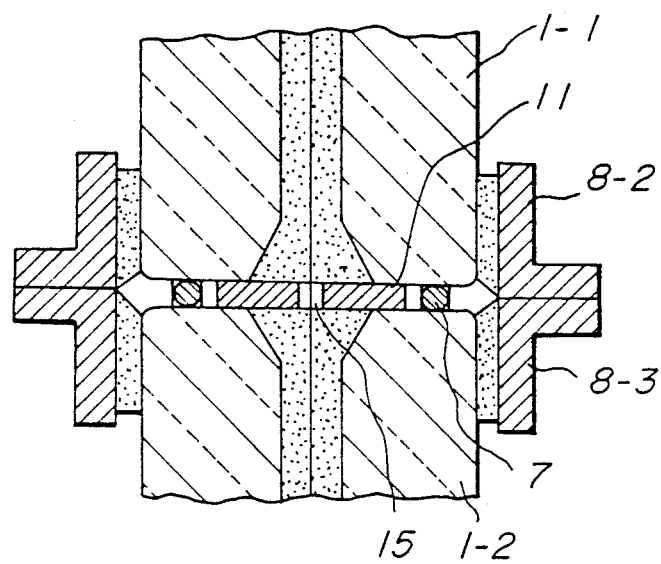
FIG_7b
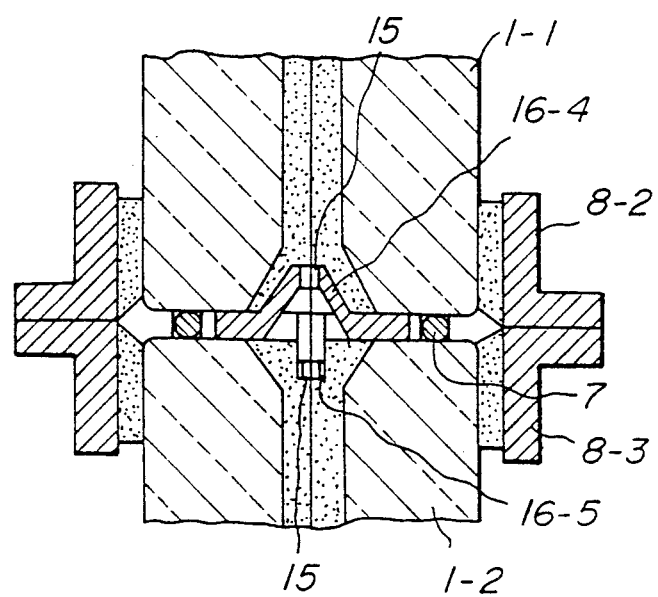

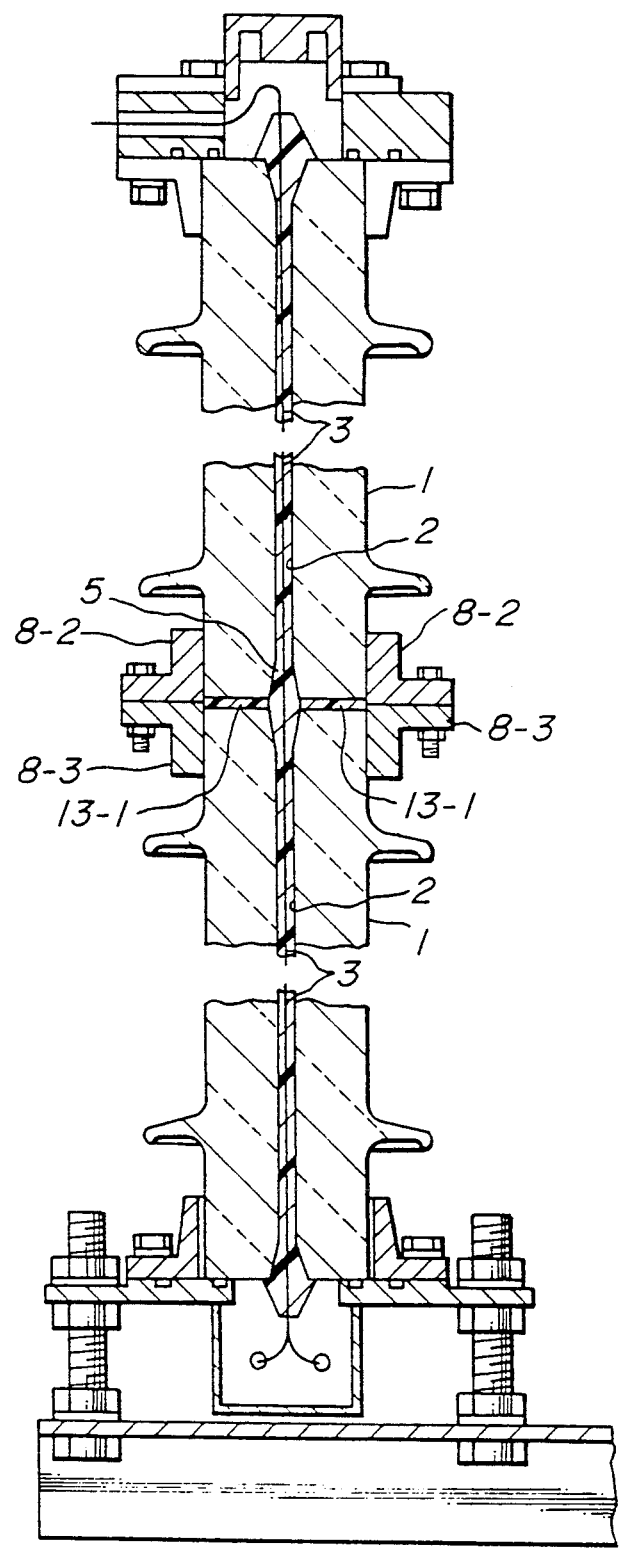
FIG_8

FIG_10

FIG_11

FIG_12

FIG_13

FIG_14

FIG_15

FIG_17

FIG_18

FIG_20

OPTICAL FIBER BUILT-IN TYPE COMPOSITE INSULATOR AND METHOD OF PRODUCING THE SAME

BACKGROUND OF THE INVENTION

1. Field of the Invention

The present invention relates to an optical fiber built-in type composite insulator which is used mainly in detection systems for finding out fault points at electric power transmission lines, electric power distribution lines, and transformer substations, etc., and a method of producing the same.

2. Related Art Statement

Heretofore, in order to automatically find out fault points in electric power supply systems, optical fiber built-in type composite insulators have been used which have a function to transmit signals from optical sensors provided at power supply source side to detectors provided at grounded side.

An example of conventional optical fiber built-in type composite insulators is shown in attached FIG. 5 wherein a structure of an optical fiber built-in type composite insulator having stacked and joined multi insulator bodies is shown. Referring to FIG. 5, an optical fiber 3 is inserted in penetration holes 2-1, 2-2 bored in the central axis portion of stacked insulator bodies 1-1, 1-2 which are connected to each other by flange type connector metallic fittings or flanges 8-2, 8-3. For airtightly sealing the inside of the insulator bodies 1-1, 1-2 from the exterior, the optical fiber 3 is fixed at the upper end of the penetration hole 2-1 and the lower end of the penetration hole 2-2, and silicone rubbers 5-1, 5-2 are arranged on the upper and lower ends as sealing stoppers for the upper and lower ends to form sealed portions, and silicone grease 4 is filled in the penetration bores 2-1 and 2-2. In addition, in order to improve airtight sealing of joined portion of the insulator bodies 1-1 and 1-2, a packing 12 made of a resilient material is arranged between the lower end of the insulator body 1-1 and the upper end of the insulator 1-2.

However, the above type optical fiber built-in type composite insulator has the following drawbacks:

(1) The silicone grease and ceramics constituting the insulator have a such large differences of thermal expansion coefficients from each other that an inner pressure is generated in the insulator when the insulator is heated and the sealing silicone rubbers forming the sealing portions of the insulators are liable to break down.

(2) The silicone grease is likely to leak out through the sealing silicone rubbers or the packing portion of the stacked insulators.

(3) The penetration bores of the stacked insulator bodies are occasionally so displaced in location from each other that the optical fiber is bent and can not be fixed in position.

Also, in the optical fiber built-in type composite insulators having stacked and joined multi insulator bodies, those having a flexible connector metallic fitting between the end surfaces of the opposing insulator bodies, those directly joining the end surfaces of the opposing insulator bodies tightly, and those directly joining the end surfaces of the opposing insulator bodies tightly and having connector metallic fittings arranged on the outer circumferential surfaces of the insulator bodies for clamping and fixing the joined end surfaces of the insulator bodies, have been known.

In such optical fiber built-in type composite insulators having stacked and joined multi insulator bodies, a sealing material filled between the connector metallic fittings and the outer circumferential surface of the insulator bodies, between the opposing end surfaces of the insulator bodies, or in the interior of the penetration bores, is deteriorated due to impregnation with moisture penetrated through the cement from the exterior, or the sealing material is impregnated with moisture and thermally expanded in the narrow gaps to destruct the insulator body when the temperature of the insulator is elevated.

Usually, in joining two insulator bodies, the insulator bodies each having a connector metallic fitting around the end of the outer circumferential surface thereof are joined at their opposing end surfaces, and sealed at their outer circumferential surfaces of the joined portion by a sealing member, and the joined portion is fixed and clamped by the connector metallic fittings with a cementing material therebetween. If the sealing is broken to permit rain drops, etc., to penetrate into the penetration bores through the opposing end surfaces of the insulator bodies, a leakage current is liable to flow along the penetration bores and short circuited trouble is likely to occur.

In addition, the joined state of the insulator bodies at the end surfaces can not be maintained for a long time by a mere fixing and clamping by means of the conventional connector metallic fittings, etc., so that joining strength of the joined portion is decreased with the elapse of time.

Moreover, when the connector metallic fittings are directly abutted to the opposing end surfaces of the insulator bodies, when the opposing end surfaces of the insulator bodies are directly abutted to each other, the opposing end surfaces of the insulator bodies can not sufficiently absorb large mechanical shocks which might occur therebetween, so that the opposing end surfaces are liable to conflict with each other and hence be destructed at the time of earthquake, etc.

Furthermore, when producing an optical fiber built-in type composite insulator having stacked and joined multi insulator bodies by stacking a multiple number of insulator bodies by means of connector metallic fittings, inserting an optical fiber in the penetration bores of the insulator bodies, and filling a silicone rubber in the penetration bores, all the assembling works have to be performed in a production plant, because the penetration bores are so small that the filling work has to be performed by an aspiration system. In addition, the insulator bodies have to be stacked before the work of inserting the optical fiber in the penetration bores, so that the production plant becomes to a large size, and the height of the stacked bodies can not be changed or varied, even if such change is required.

SUMMARY OF THE INVENTION

An object of the present invention is to obviate the above drawbacks.

Another object of the present invention is to provide an optical fiber built-in type composite insulator of a high reliability having stacked and joined multi insulator bodies, which can prevent leakage of silicone grease or a sealing material from joined portion or packing portion of the stacked and joined insulator bodies.

A further object of the present invention is to provide an optical fiber built-in type composite insulator having stacked and joined multi insulator bodies, which can prevent leakage of the sealing material and destruction of the insulator bodies due to thermal expansion and prevent penetration of rain drops, etc., in the joined portion from the exterior so as to prevent the short circuited troubles along the penetration bores, and which can maintain joining strength of the joined portion for a long period of time.

A still further object of the present invention is to provide an optical fiber built-in type composite insulator having stacked and joined multi insulator bodies, which can prevent destruction of the insulator bodies even when the sealing material is leaked and thermally expanded in the joining portion, which can prevent the penetration of rain drops, etc., in the joined portion from the exterior to prevent the short circuited troubles along the penetration bores, and which can absorb mechanical shocks which might be produced at the opposing end surfaces of the stacked insulator bodies at the time of earthquake, etc., to prevent destruction of the joined opposing end surfaces of the insulator bodies.

Another object of the present invention is to provide an optical fiber built-in type composite insulator having stacked and joined multi insulator bodies, which can afford easy assembling works thereof also at outside of the production plant, which can minimize the production plant, and which can vary the height of the stacked insulator bodies, if desired.

Now, the above objects can be achieved by the present invention.

According to the first aspect of the present invention, the present invention is an optical fiber built-in type composite insulator, including an insulator body having a penetration bore in its central axis portion, at least one optical fiber inserted in the penetration bore, and a silicone grease sealingly filled in the middle portion of the penetration bore, comprising, silicone rubbers sealingly filled in the upper and lower end portions of the penetration bore, and a corrosion resistant partition wall arranged between the silicone grease and the silicone rubbers.

According to a second aspect of the present invention, the present invention is an optical fiber built-in type composite insulator including at least two insulator bodies each having a penetration bore in its central axis portion, at least one optical fiber inserted in the penetration bores, flange type connector metallic fittings joined to the insulator bodies to airtightly stack and join the insulator bodies to each other so as to connect the penetration bores to each other, and a silicone grease sealingly filled in the middle portion of the penetration bores, comprising, dual O-rings arranged at a joined portion of the insulator bodies, at least the inside O-ring of the dual O-rings being constituted by a material stable to the silicone grease, and a silicone rubber sealingly filled between the dual O-rings.

According to a third aspect of the present invention, the present invention is an optical fiber built-in type composite insulator including at least two insulator bodies each having a penetration bore in its central axis portion, at least one optical fiber inserted in the penetration bores, flange type connector metallic fittings joined to the insulator bodies to airtightly connect the insulator bodies to each other, and a silicone grease sealingly filled in the middle portion of the penetration bores, comprising, silicone rubbers sealingly filled in the upper and lower end portions of the communicated penetration bores of the stacked and connected insulator bodies, a corrosion resistant partition wall arranged between the silicone grease and the silicone rubbers, dual O-rings arranged at joined portions of the insulator bodies, at least the inside O-ring of the dual O-rings being constituted by a material stable to the silicone grease, and a silicone rubber sealingly filled between the dual O-rings.

According to a fourth aspect of the present invention, the present invention is an optical fiber built-in type composite insulator including at least two insulator bodies each having a penetration bore in its central axis portion, at least one optical fiber inserted in the penetration bores, and flange type connector metallic fittings joined to the insulator bodies to airtightly stack and join the insulator bodies to each other so as to connect the penetration bores to each other, comprising, tapered portions at the upper and lower end portions of the penetration bores, a silicone rubber sealingly filled and bonded around the optical fiber in the penetration bores, and at least one spacer arranged at at least one joined portion of the insulator bodies for firmly fixing the position of the optical fiber in the penetration bores.

According to a fifth aspect of the present invention, the present invention is an optical fiber built-in type composite insulator, comprising, at least two insulator bodies each having a penetration bore in its central axis portion, at least one optical fiber inserted in the penetration bores, the insulator bodies being stacked and joined to each other, and a bonding material arranged in a space between opposing end surfaces of the stacked and joined insulator bodies for sealing.

The bonding material may be a resinous bonding material, or it may be an inorganic bonding material which can be heated for the sealing.

The bonding material can be used for sealing spaces between the opposing end surfaces of the insulator bodies and a spacer inserted between the opposed end surfaces, the spacer may be made of a material having a thermal expansion coefficient closely the same as that of the insulator bodies, and the spacer can have a perforation hole having a diameter larger than at least the diameter of the penetration bores at a position corresponding to the penetration bores.

The optical fiber is sealed in the penetration bores by a sealing material, while providing a space between the bonding material and the sealing material and the opposing end surfaces of the insulator bodies.

The opposing end portions of the insulator bodies may have a diameter larger than that of the body portions of the insulator bodies.

According to a sixth aspect of the present invention, the present invention is an optical fiber built-in type composite insulator, comprising, at least two insulator bodies each having a penetration bore in its central axis portion, the insulator bodies being stacked and joined to each other, at least one optical fiber inserted in the penetration bores, and a hermetically sealing member arranged between opposing end surfaces of the joined insulator bodies for surrounding the penetration bores and resiliently abutting on the opposing end surfaces of the joined insulator bodies.

The hermetically sealing member may be an O-ring, or it may be a foamy organic material and filled in a space formed between or in the insulator bodies.

Alternatively, the hermetically sealing member may be O-rings attached on the both sides of a spacer inserted between the opposing end surfaces of the insulator bodies, and the spacer may have a perforation hole having a diameter smaller than the diameter of the O-rings and still larger than at least the diameter of the penetration bores at the position corresponding to the penetration bores.

According to a seventh aspect of the present invention, the present invention is an optical fiber built-in type composite insulator including at least two insulator bodies each having a penetration bore in its central axis portion, the insulator bodies being stacked and joined to each other, and at least one optical fiber inserted in the penetration bores, comprising, at least one space formed between opposing end surfaces of the insulator bodies for serving as at least one joining portion, each joining portion receiving an extended portion of the optical fiber extending from the penetration bore, and the extended portions of the optical fibers being joined at its opposing end surfaces in the joining portion.

According to an eighth aspect of the present invention, the present invention is an optical fiber built-in type composite insulator including at least two insulator bodies each having a penetration bore in its central axis portion, the insulator bodies being stacked and joined to each other, and at least one optical fiber inserted in the penetration bores, comprising, a joining portion of adjacent insulator bodies being formed between the opposing end surfaces of the insulator bodies with a spacer ring inserted therein.

According to a ninth aspect of the present invention, the present invention is an optical fiber built-in type composite insulator including at least two insulator bodies each having a penetration bore in its central axis portion, the insulator bodies being stacked and joined to each other, and at least one optical fiber inserted in the penetration bores, comprising, a joining portion of adjacent insulator bodies being formed between opposing end surfaces of the insulator bodies with a connector metallic fitting having a perforation hole of a diameter larger than at least a minimum bending radius of the optical fiber at the bottom, the connector metallic fitting being accommodated fixedly between the opposing end surfaces of the insulator bodies.

According to a tenth aspect of the present invention, the present invention is an optical fiber built-in type composite insulator including at least two insulator bodies each having a penetration bore in its central axis portion, the insulator bodies being stacked and joined to each other, and at least one optical fiber inserted in the penetration bores, comprising, a gelatinous, foamy or rubbery sealing material filled in the penetration bores of the insulator bodies for fixing the optical fiber, a space formed between opposing end surfaces of the insulator bodies for serving as a joining portion, the joint portion receiving an extended portion of the optical fiber extended from the penetration bores while the optical fiber is guided spirally by the sealing material and opposing end surfaces of the extended portions of the optical fibers being abuttedly joined to each other.

According to an eleventh aspect of the present invention, the present invention is an optical fiber built-in type composite insulator including at least two insulator bodies each having a penetration bore in its central axis portion, the insulator bodies being stacked and joined to each other, and at least one optical fiber inserted in the penetration bores, comprising, a gelatinous, foamy or rubbery insulative material filled in a joining portion of the opposing end surfaces of adjacent insulator bodies.

According to a twelfth aspect of the present invention, the present invention is an optical fiber built-in type composite insulator including at least two insulator bodies each having a penetration bore in its central axis portion, the insulator bodies being stacked and joined to each other, and at least one optical fiber inserted in the penetration bores, comprising, a tapered portion formed at the end portion of the penetration bores of the insulator bodies for assuring a permissible minimum bending radius of the optical fiber.

According to a thirteenth aspect of the present invention, the present invention is an optical fiber built-in type composite insulator including at least two insulator bodies each having a penetration bore in its central axis portion, the insulator bodies being stacked and joined to each other, and at least one optical fiber inserted in the penetration bores, comprising, a joining portion of adjacent insulator bodies being formed between the insulator bodies, the joining portion assuring a minimum distance of levels that a cylindrical connector metallic fitting with a perforation hole can be accommodated in the opposing end portions of the insulator bodies with a minimum bending radius of the optical fiber, and the connector metallic fitting assuring a minimum bonding area that can pertain mechanical strength of the insulator bodies.

In the arrangement of the first aspect of the present invention, the upper and lower end portions of the penetration bores penetrating the central portion of the insulator body are sealed substantially by silicone rubbers, and a partition wall made of a corrosion resistant material not reactive with a silicone grease, such as, nitrile rubber, butyric rubber, urethane rubber, polychloroprene rubber, styrene butadiene rubber, isoprene rubber, natural rubber, epoxy resin, acrylic resin, phenolic resin, polyvinylformal resin, polyvinylbutyral resin, or copolymeric nylon, etc., is arranged at the portion of the penetration bore that contacts the silicone grease, and preferably a porous rubber made of, for example, nitrile rubber, butyric rubber, or urethane rubber, etc., is arranged in the inside of the partition wall, so that the silicone rubbers and the silicone grease are separated from each other and prevented from reacting with each other and the sealing is kept safe without being broken, and a leakage of the silicone grease from the upper and lower ends of the penetration bores can be eliminated.

In the arrangement of the second aspect of the present invention, the insulator bodies are stacked in multiple numbers, the dual O-rings are provided on the joining portion of the stacked insulator bodies, and at least the inner O-ring that contacts the silicone grease is made of a stable material that does not react with the silicone grease, for example, nitrile rubber, butyric rubber, or urethane rubber, etc., so that breakage of the sealing at the joining portion can be prevented and hence leakage of the silicone grease from the joining portion of the insulator bodies can be prevented. In addition, the provision of the silicone rubber between the dual O-rings can provide a more satisfactory sealing of the joining portion of the insulator bodies.

In the arrangement of the third aspect of the present invention, the insulator bodies are stacked in multiple numbers, the structures of the upper and lower end portions of the stacked insulator bodies are made similar to those of the first aspect of the present invention, and the structure of the joining portion of the insulator bodies is made similar to that of the second aspect of the present invention, so that the upper and lower end portions of the penetration bores and the joining portion of the insulator bodies can be sealed completely.

In the arrangements of the second and third aspects of the present invention, if at least one spacer made of epoxy resin, or urethane rubber, etc., for fixing the optical fiber in the penetration bores of the stacked insulator bodies is provided at the joining portion of the stacked insulator bodies, the optical fiber in the penetration bores of the stacked insulator bodies can be advantageously prevented from bending and breakage.

In the arrangement of the fourth aspect of the present invention, tapered portions are provided on the upper and lower end portions of the penetration bores of the insulator bodies, so that the sealing by the silicone rubber at the sealing portion is prevented from breakage. Silicone rubber having superior adhesive property to the insulator bodies is introduced and sealed in the whole of the penetration bores instead of silicone grease, so that leakage of silicone grease from the sealing portion and the stacked packing portion can be eliminated. A spacer is used for adjusting the positioning of the optical fiber in the stacked insulator bodies, so that the optical fiber can be fixed firmly without a displacement thereof in the stacked insulator bodies.

If an O-ring made of a resilient member is provided on the joining portion of the opposing end surfaces of the stacked and joined insulator bodies, the sealing property of the joining portion is advantageously enhanced.

In the arrangement of the fifth aspect of the present invention, if a bonding material is applied on the opposing end surfaces of the insulator bodies to be joined and the opposing end surfaces of the insulator bodies are joined under pressure, the opposing end surfaces of the joined insulator bodies are sealed by the bonding material without leaving a space therebetween, so that the sealing material filled in the penetration bores does not leak between the opposing end surfaces of the joined insulator bodies.

Because the opposing end surfaces of the joined insulator bodies are sealed, leakage of rain drops, etc., to the penetration bores from the exterior through the opposing end surfaces of the joined insulator bodies is prevented.

After the bonding material sealing the opposing end surfaces is cured or hardened, the bonding material can maintain the joining strength of the joined insulator bodies for a long period of time.

The space between the bonding material and the sealing material can absorb thermal expansion of the sealing material.

By making the diameter of the opposing end surfaces of the insulator bodies larger than the diameter of the body portions of the insulator bodies, the opposing end surfaces of the insulator bodies to be stacked and joined can have a larger surface area, so that the joining strength of the joined insulator bodies can be improved.

In the arrangement of the sixth aspect of the present invention, the hermetically sealing member surrounds the penetration bores filled with the sealing material, abuts resiliently on the end surfaces of insulator bodies, and absorbs thermal expansion of the sealing material by the resiliency of the hermetically sealing member per se when the sealing material is thermally expanded. The hermetically sealing member prevents rain drops, etc., from permeating to the penetration bores from the exterior. In addition, the hermetically sealing member has its own resiliency, so that it absorbs mechanical shocks which might be produced between the opposing end surfaces of the joined insulator bodies at the time of an earthquake, etc.

In the arrangement of the seventh aspect of the present invention, the extended portions of the optical fibers extending from the penetration bores are joined to each other at their end surfaces in the joining portions of the insulator bodies, and the joined extended portions of the optical fibers are contained in the joining portions.

In the arrangement of the seventh aspect of the present invention, the spacer ring forms a part of the joining portion of the stacked and joined adjacent insulator bodies.

In the arrangement of the ninth aspect of the present invention, the optical fiber is accommodated in the joining portion of the insulator bodies, while the joining portion maintains a minimum bending radius of the optical fiber with the aid of the perforation hole of the connector metallic fitting.

In the arrangement of the tenth aspect of the present invention, the optical fibers inserted in the penetration bores are fixed therein by the sealing material, while the extended portions of the optical fibers extended from the penetration bores are guided spirally in the joining portions of the insulator bodies, so that there is danger of the optical fibers being exerted by untolerable bending forces.

In the arrangement of the eleventh aspect of the present invention, the gelatinous, foamy or rubbery insulating material filled in the joining portion of the insulator bodies acts to insulate the opposing end surfaces of the insulator bodies from each other.

In the arrangement of the twelfth aspect of the present invention, the extended portions of the optical fibers spirally guided in the joining portions by the sealing material can obtain assuredly a permissible minimum bending radius of the optical fibers with the aid of the tapered portions of the penetration bores.

In the arrangement of the thirteenth aspect of the present invention, the optical fibers are accommodated in the joining portions while holding a minimum bending radius of the optical fibers by means of the cylindrical connector metallic fitting with a perforation hole, and the insulator bodies are firmly fixed by the connector fittings for assuredly maintaining the joining portions of pertained mechanical strength.

BRIEF DESCRIPTION OF THE DRAWINGS

For a better understanding of the present invention, reference is made to the accompanying drawings, in which:

FIGS. 4a and 4b are respectively a schematic cross-sectional view of an example of the composite insulator of the fourth aspect of the present invention, showing an arrangement of the spacer;

FIG. 5 is a schematic cross-sectional view of an example of conventional optical fiber built-in type composite insulator;

FIGS. 7a and 7b are respectively a schematic partial cross-sectional view of an example of the composite insulator of the fourth aspect of the present invention, showing an arrangement of the spacer;

FIG. 8 is a schematic cross-sectional view of the composite insulator of the first embodiment of the composite insulator of the fifth aspect of the present invention;

Figure 1:
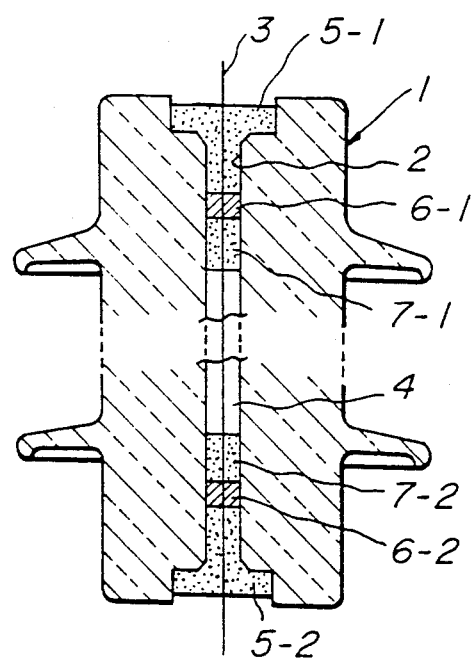
FIG. 1 is a schematic cross-sectional view of an example of the optical fiber built-in type composite insulator of the first aspect of the present invention.

Numberings in the drawings.
1, 1-1, 1-2, 1-3 . . . insulator body
2, 2-1, 2-2 . . . penetration bore
3 . . . optical fiber
3-1 . . . remaining portion of the optical fiber
4 . . . silicone grease
4-1, 4-2, 4-3, 4-4 . . . tapered portion
5, 5-1, 5-2, 5-3 . . . silicone rubber
6-1, 6-2 . . . partition wall
7 . . . O-ring
7-1, 7-2 . . . cushioning member
8-1 through 8-6 . . . flange type connector metallic fitting
9-1, 9-2 . . . O-ring
10 . . . silicone rubber
11 . . . spacer
12, 12-1, 12-2 . . . packing
13 . . . cement
13-1 . . . resin as a bonding material
13-2 . . . glaze as a bonding material
13-3 . . . inorganic glass as a bonding material
13-4 . . . sand
14 . . . circular groove
15 . . . perforation hole
16-1 through 16-5 . . . spacer
17 . . . end surface
18 . . . space
19 . . . joined portion
20 . . . joining portion
21 . . . packing
22 . . . tapered portion
23 . . . oblique inlet hole
23a . . . female screw
24 . . . silicone rubber as a sealing material
24a a . . . outlet
25 . . . silicone as an insulation material
26 . . . tap screw
27 . . . seating plate
28 . . . spacer
29 . . . O-ring
30 . . . packing
31 . . . cavity
32 . . . supporting protrusion
33 . . . perforation hole
34 . . . flange
35 . . . cap
36 . . . support ring
37 . . . joint Throughout different views of the drawings, a same reference number represents a same part, element or portion, unless otherwise specified.

DESCRIPTION OF THE PREFERRED EMBODIMENTS

Referring to FIG. 1, an embodiment of the composite insulator of the first aspect of the present invention is shown. In this embodiment, an optical fiber 3 is inserted in a penetration bore 2 penetrating the central axis portion of an insulator body 1, and silicone rubbers 5-1, 5-2 are provided on the upper and lower ends of the insulator body 1 in order to prevent a silicone grease 4 in the penetration bore 2 from flowing out therefrom. Between the silicone rubbers 5-1, 5-2 and the silicone grease 4, are provided partition walls 6-1, 6-2 made of a corrosion resistant material, such as, nitrile rubber, butyric rubber, urethane rubber, epoxy resin, acrylic resin, or the like material which does not react with the silicone grease 4, and also cushioning members 7-1, 7-2 made of a porous rubber for absorbing expansion and shrinkage of the silicone grease 4.

Figure 2:
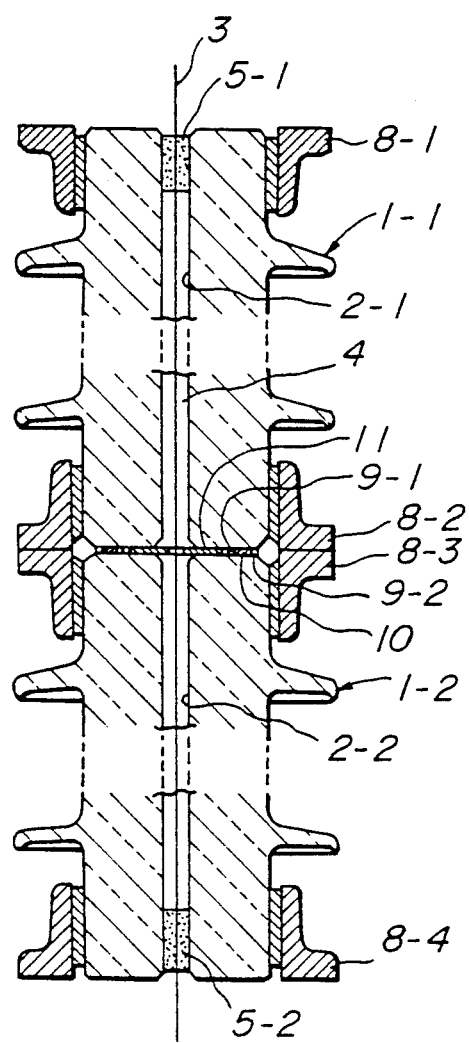
FIG. 2 is a schematic cross-sectional view of an example of the composite insulator of the second aspect of the present invention.

Referring to FIG. 2, an embodiment of the composite insulator of the second aspect of the present invention is shown, wherein a multiple number of insulator bodies are stacked and joined to construct the optical fiber built-in type composite insulator of the present invention. In this embodiment, an optical fiber 3 is inserted in penetration bores 2-1, 2-2 penetrating the central axis portions of stacked and joined two insulator bodies 1-1, 1-2, and the upper end of the penetration bore 1-1 and the lower end of the penetration bore 2-2 are sealed by silicone rubbers 5-1, 5-2, in order to prevent a silicone grease 4 in the penetration bores 2-1, 2-2, from flowing out therefrom. On the both ends of the insulator bodies 1-1, 1-2, are provided flange type connector metallic fittings 8-1 through 8-4, and the metallic fittings 8-2, 8-3 serve to connect the insulator bodies 1-1, 1-2.

In addition, dual O-rings 9-1, 9-2 made of a resilient material are provided in the joining portion of the insulator bodies 1-1, 1-2 which is the boundary layer of the lower end of the insulator body 1-1 and the upper end of the insulator body 1-2, and the inner O-ring 9-1 is made of nitrile rubber, butyric rubber, or urethane rubber, etc., which is stable and hardly reacts with the silicone grease 4. Between the dual O-rings 9-1, 9-2 is provided a silicone rubber 10 for improving the sealing property of the joining portion. In the inside of the O-ring 9-1 is provided a spacer 11 having a perforation hole in the center for allowing insertion of the optical fiber 3, in order to adjust the position of the optical fiber 3.

Figure 3:
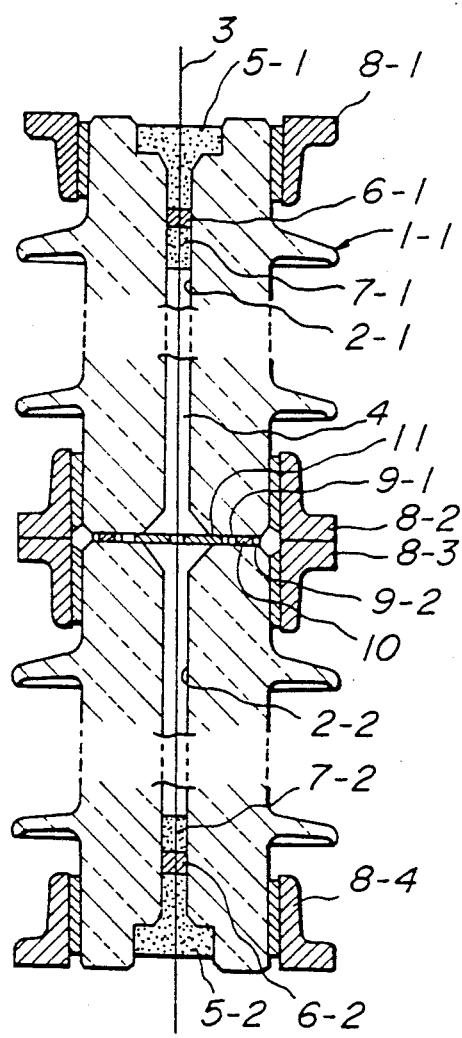
FIG. 3 is a schematic cross-sectional view of an example of the composite insulator of the third aspect of the present invention.

Referring to FIG. 3, an embodiment of the composite insulator of the third aspect of the present invention is shown, wherein a multiple number of insulator bodies are stacked and joined to construct the composite insulator of the present invention. The sealing structures at the upper end portion of the penetration bore 2-1 of the insulator body 1-1 and the lower end portion of the penetration bore 2-2 of the insulator body 1-2 are the same as those of the first aspect shown in FIG. 1, and the structure of the joining portion of the lower end of the insulator body 1-1 and the upper end of the insulator body 1-2 is the same as that of the second aspect shown in FIG. 2. This embodiment can achieve improvements in both sealing properties at the upper and lower end portions of the first aspect and at the joining portion of the insulator bodies of the second aspect.

Referring to FIGS. 4a and 4b, a state of the spacer 11 in the composite insulator of the second aspect and the third aspect is shown, respectively. In the embodiment shown in FIG. 4a, a single spacer 11 is used similarly as in the embodiments of FIGS. 2 and 3. That is, a spacer 11 having in its central axis portion perforation holes 15 of numbers corresponding to numbers of the optical fibers 3 to be inserted in the penetration bores is arranged at the boundary layer between the lower end of the insulator body 1-1 and the upper end of the insulator body 1-2. For that purpose, preferably, the thickness of the spacer 11 is equal to or slightly thinner than a thickness of the resilient O-rings 9-1, 9-2 of mounted state, or recessed portions for mounting the spacer 11 are provided on the lower end surface of the insulator body 1-1 and the upper end surface of the insulator body 1-2.

In the embodiment shown in FIG. 4b, two spacers are used. That is, spacers 16-1, 16-2 each having the central portion recessed to the direction of the insulator body 1-1 or to the direction of the insulator body 1-2 and having perforation holes 15 of numbers corresponding to numbers of the optical fiber 3 to be inserted in the penetration bores 2-1, 2-2, are sandwiched in the joining layer between the lower end of the insulator body 1-1 and the upper end of the insulator body 1-2 in such a fashion as to make an angle of 90° to each other. By this arrangement, even if the positions of the penetration bores 2-1, 2-2 are displaced widely to each other, the spacers 16-1, 16-2 can more satisfactorily adjust a bending of the optical fibers 3 and prevent breakage of the optical fiber 3 than in the case of single spacer 11, because the central portions of the spacers 16-1, 16-2 are also displaced relative to the displacement of the penetration bores 2-1, 2-2. In such case, preferably, ring-shaped auxiliary members made of a porous rubber are provided around the central portions of the spacers 16-1, 16-2.

Figure 6:
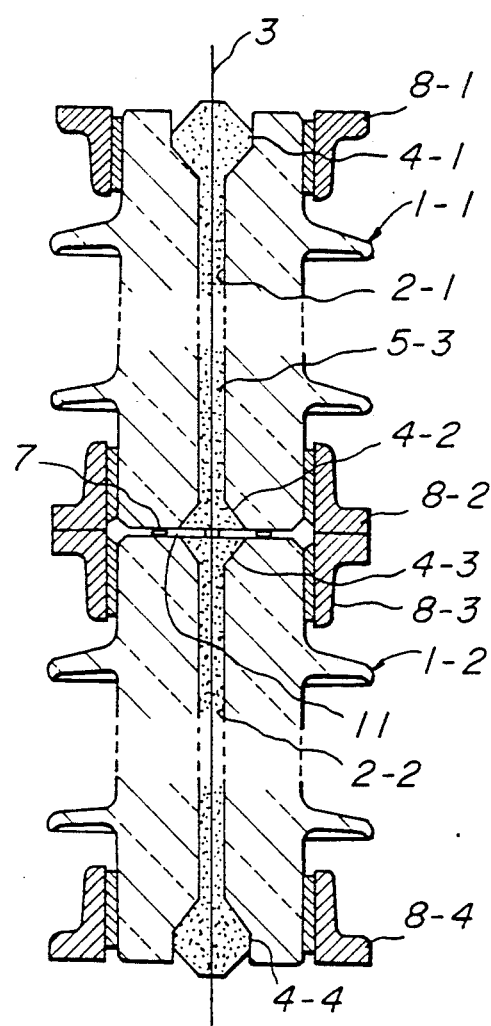
FIG. 6 is a schematic cross-sectional view of an example of the composite insulator of the fourth aspect of the present invention.

Referring to FIG. 6, an embodiment of the composite insulator of the fourth aspect of the present invention is shown, wherein a multiple number of insulator bodies are stacked and joined. In this embodiment, an optical fiber 3 is inserted in the penetration bores 2-1, 2-2 penetrating the central axis portions of stacked and joined two insulator bodies 1-1, 1-2, and tapered portions 4-1 through 4-4 are formed on both ends of the penetration bores 2-1, 2-2. In addition, flange type connector metallic fittings 8-1 through 8-4 are provided on both ends of the insulator bodies 1-1, 1-2, and the metallic fittings 8-2, 8-3 serve to connect the insulator bodies 1-1, 1-2 to each other.

In order to maintain an airtight sealing in the insulator bodies 1-1, 1-2 and to fix the optical fiber 3 in the penetration bores 2-1, 2-2, the tapered portions 4-1 through 4-4 and the interior of the penetration bores 2-1, 2-2 are sealed by a silicone rubber 5-3. At the boundary layer between the lower end of the insulator body 1-1 and the upper end of the insulator body 1-2 are provided an O-ring 7 made of a resilient member and a spacer 11 having in the central axis portion a perforation hole for insertion of the optical fiber 3 in order to adjust the position of the optical fiber 3. The spacer is preferably made of epoxy resin, urethane rubber, or butyric rubber, etc.

By this arrangement, the tapered portions 4-1 through 4-4 of both end portions of the penetration bores 2-1, 2-2 are sealed by the silicone rubbers 5-3, so that the sealings at both end portions of the insulator bodies 1-1, 1-2 are prevented from breakage, while the sealing by the silicone rubber 5-3 and the provision of the O-ring 7 prevent the silicone rubber 5-3 in the penetration bores 2-1, 2-2 from leaking out from the boundary layer between the lower end of the insulator body 1-1 and the upper end of the insulator body 1-2. In addition, a spacer 11 is provided on the boundary surface and the optical fiber 3 is inserted in the perforation hole provided at the central axis portion thereof, so that bending and breakage of the optical fiber 3 resulting from displacement of the penetration bores 2-1, 2-2 of the stacked and joined insulator bodies can be prevented.

Referring to FIGS. 7a and 7b, a state of the spacer 11 of an embodiment of the composite insulator of the fourth aspect of the present invention is shown. In the embodiment shown in FIG. 7a, a single spacer 11 is used similarly as in the embodiment of FIG. 6. That is, a spacer 11 having in the central axis portion perforation holes of numbers corresponding to numbers of the optical fiber 3 to be inserted in the penetration bores, is arranged in the boundary layer between the lower end of the insulator body 1-1 and the upper end of the insulator body 1-2, so that preferably the thickness of the spacer 11 is made equal to or slightly thinner than a thickness of the resilient O-ring 7 of mounted state, or recessed portions for mounting the spacer 11 are provided on the lower end surface of the insulator body 1-1 and the upper end surface of the insulator body 1-2.

In the embodiment shown in FIG. 7b, two spacers are used. That is, spacers 16-4, 16-5 each having the central axis portion recessed to the direction of the insulator body 1-1 or to the direction of the insulator body 1-2 and having perforation holes 15 of numbers corresponding to numbers of the optical fiber 3 to be inserted in the penetration bores, are sandwiched in the joining layer between the lower end of the insulator body 1-1 and the upper end of the insulator body 1-2 in such a fashion as to make an angle of 90° to each other. By this arrangement, even if the positions of the penetration bores are displaced widely to each other, the spacers 16-4, 16-5 can more satisfactorily adjust bending of the optical fiber 3 and prevent breakage of the optical fiber 3 than in the case of a single spacer 11, because the central portions of the spacers 16-4, 16-5 are also displaced relative to the displacement of the penetration bores. In such case, preferably ring-shaped auxiliary members made of a porous rubber are provided around the central axis portions of the spacers 16-4, 16-5.

Figure 9:
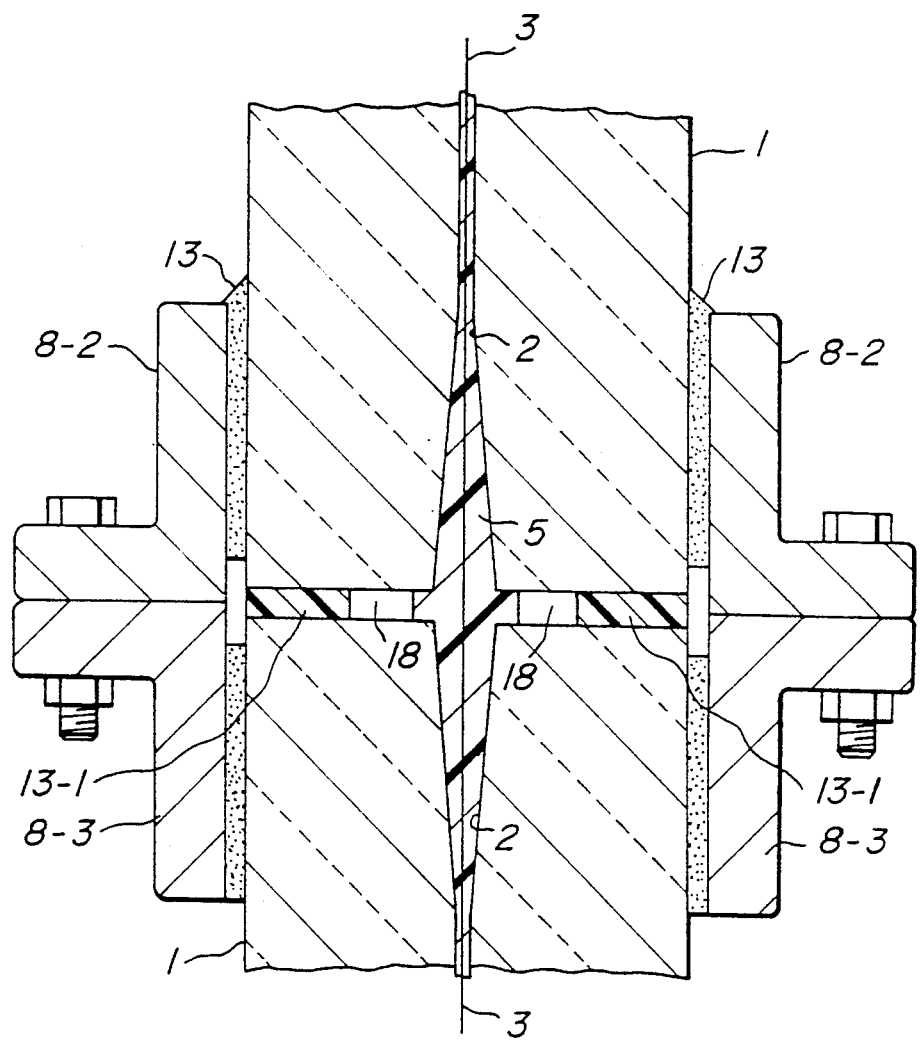
FIG. 9 is a schematic partial enlarged cross-sectional view thereof.

Referring to FIGS. 8 and 9, a first embodiment of the composite insulator of the fifth aspect of the present invention is shown, wherein two insulator bodies 1 are stacked and connected in series with their opposing end surfaces being joined to each other, and silicone rubber 5 is filled in the penetration bores 2 in order to prevent permeation of rain drops, etc., to the penetration bores so as to prevent a leakage current from flowing through the penetration pores.

In the embodiment shown in FIG. 9, the opposing end surfaces of the joined insulator bodies 1, 1 is sealed by a resinous bonding material 13-1. The insulator bodies 1, 1 are provided with connector metallic fittings 8-2, 8-3 for reinforcing the joining strength of the opposing end surfaces by the resin 13-1. The outer circumferential surface of the end portions of the joined insulator bodies and the connector metallic fittings 8-2, 8-3 are bonded by a cement 13.

Spaces 18, 18 formed between the resin 13-1 and the silicone rubber 5 absorb expanded silicone rubber 5 when the silicone rubber 5 is thermally expanded.

By applying the resin 13-1 on the opposing end surfaces of the insulator bodies 1, 1, and joining the end surfaces under pressure, the end surfaces are joined firmly and sealed watertightly to prevent permeation of rain drops, etc., through the joined end surfaces to the penetration bores 2, 2.

Figure 10:
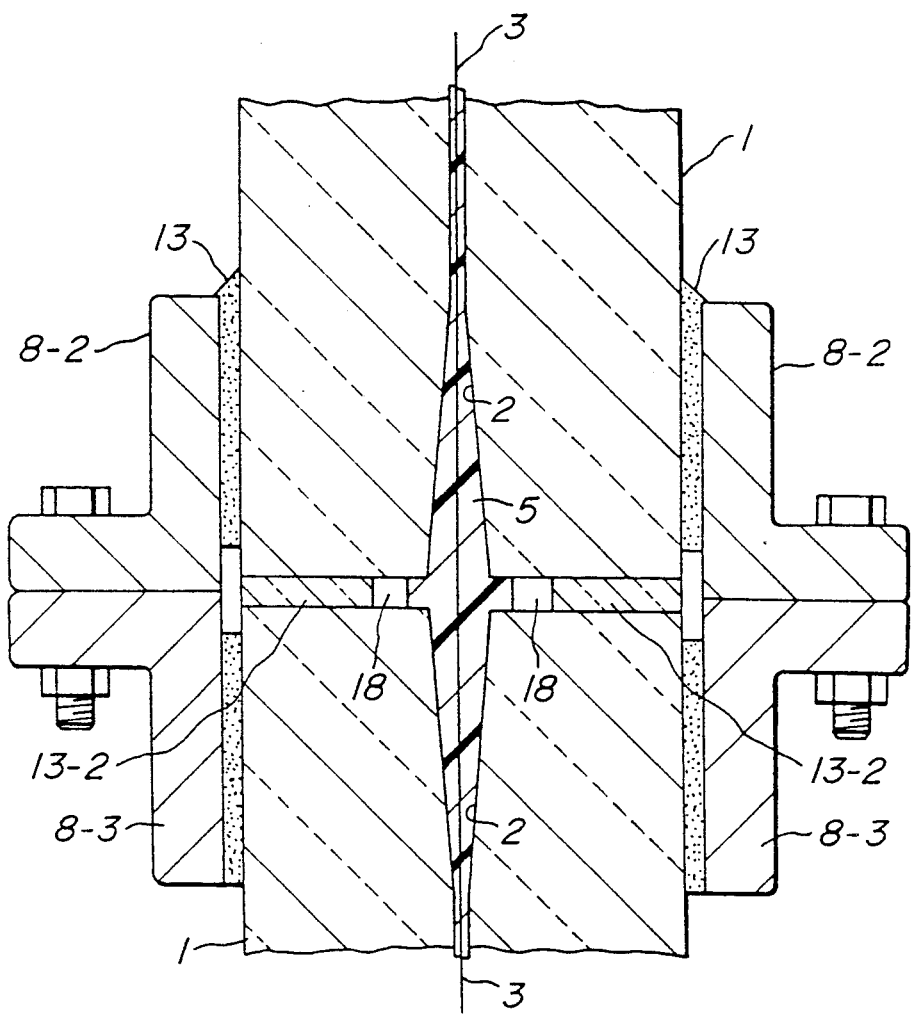
FIG. 10 is a schematic partial enlarged cross-sectional view of the second embodiment of the composite insulator of the fifth aspect of the present invention.

Referring to FIG. 10, a second embodiment of the composite insulator of the fifth aspect of the present invention is shown, wherein insulator bodies 1, 1 are joined at opposing end surfaces by a glaze 13-2 as a bonding material.

In this second embodiment, the glaze 13-2 is applied on opposing end surfaces of the insulator bodies 1, 1, and the opposing end surfaces with the applied glaze are glued to each other under pressure to temporarily join the insulator bodies. Then, the insulator bodies are heated to sinter the glaze between the opposing end surfaces to accomplish firm bonding of the opposing end surfaces of the insulator bodies 1, 1.

An inorganic material, such as, inorganic glass, etc., may also be used as a bonding material for bonding the insulator bodies under heating, instead of the glaze 13-2.

Figure 11:
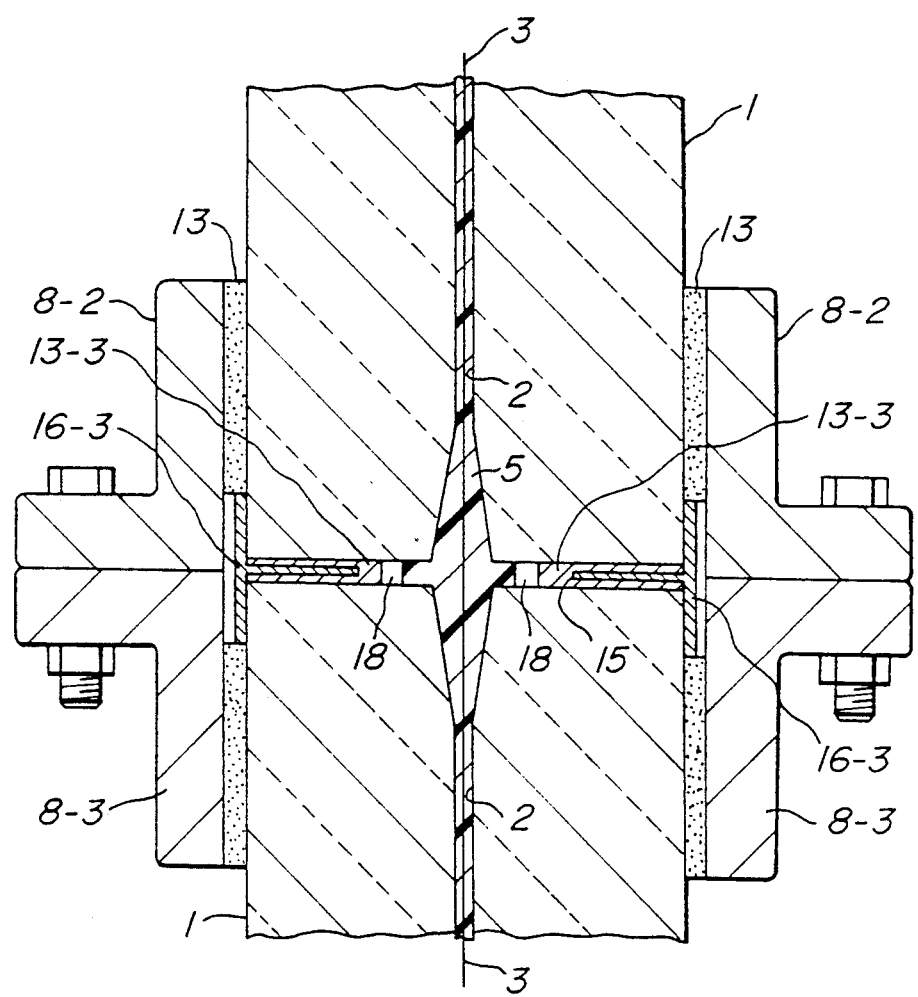
FIG. 11 is a schematic partial enlarged cross-sectional view of the third embodiment of the composite insulator of the fifth aspect of the present invention.

Referring to FIG. 11, a third embodiment of the composite insulator of the fifth aspect of the present invention is shown, a spacer plate 16-3 made of Kovar having a thermal expansion coefficient same as that of the insulator body 1 and a perforation hole 15 of a diameter half that of the insulator body 1 in the central portion thereof is inserted between the opposing end surfaces of the insulator bodies 1, 1, and an inorganic glass 13-3 is used as a bonding material for sealing between the end surfaces of the insulator bodies 1, 1 and the Kovar plate 16-3.

In this embodiment also, an inorganic glass 13-3 is applied on the opposing end surfaces of the insulator bodies 1, 1 to be joined similarly as in the second embodiment as well as on the surfaces of the Kovar plate 16-3, and the opposing end surfaces with the applied inorganic glass 13-3 and the Kovar plate 16-3 therebetween are glued to each other under pressure to effect a temporary joining of the insulator bodies 1, 1 and the Kovar plate 16-3. Then, the insulator bodies 1, 1 and the Kovar plate 16-3 are heated to sinter the inorganic glass 13-3 between the opposing end surfaces and the Kovar plate to accomplish firm bondinq between the opposing end surfaces of the insulator bodies and the Kovar plate.

Because in the third embodiment the Kovar plate 16-3 has the same thermal expansion coefficient as that of the insulator body, only one sintering operation is sufficient for the firm bonding, if the opposing end surfaces of the insulator bodies 1, 1 to be joined and the surfaces of the Kovar plate 16-3 are applied with the inorganic glass 13-3, and glued to each other under pressure to effect a temporary bonding, and then heat treated for the firm bonding.

Alternatively, the Kovar plate 16-3 may be provided with electrodes and heated by applying an electric current on the electrodes, so as to melt the inorganic glass applied on the opposing end surfaces and around the periphery of the penetration bores 2, 2 for firmly joining the opposing end surfaces of the insulator bodies 1, 1 and the Kovar plate 16-3.

Figure 12:
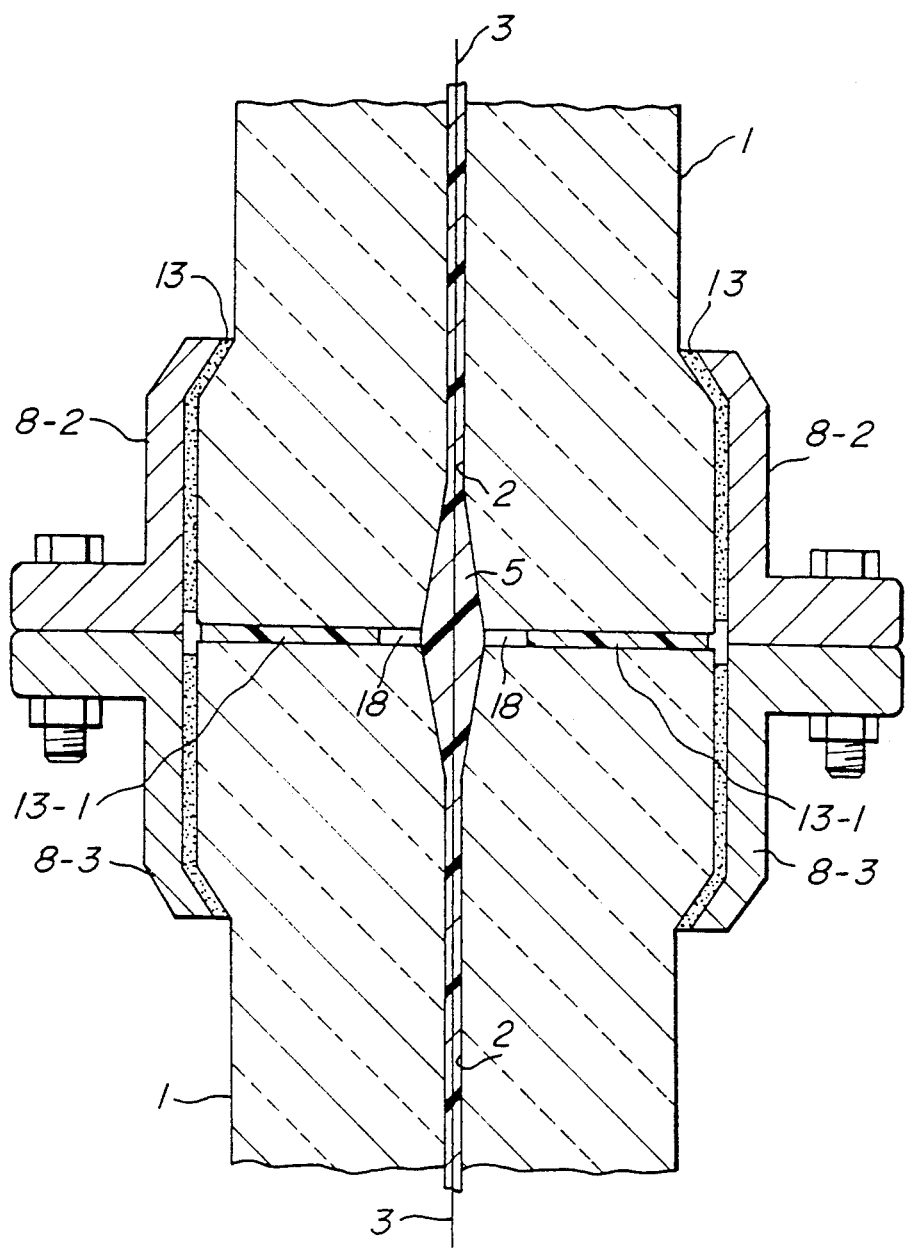
FIG. 12 is a schematic partial enlarged cross-sectional view of the fourth embodiment of the composite insulator of the fifth aspect of the present invention.

Referring to FIG. 12, a fourth embodiment of the composite insulator of the fifth aspect of the present invention is shown, wherein the joining portion of the opposing end surfaces of the insulator bodies of the first embodiment is modified to have a diameter larger than that of the body portion of the insulator bodies 1, 1. Therefore, connector metallic fittings 8-2, 8-3 which are fixed on the outer peripheral surface of the opposing end portions of the insulator bodies for clamping the opposing end surfaces have such shape to adapt the outer configuration of the opposing end surfaces of the insulator bodies 1, 1.

In the fourth embodiment, the opposing end surfaces of the insulator bodies 1, 1 are joined with a larger joining surface area than that of the first embodiment, so that the joining strength of the insulator bodies 1, 1 is improved further. Though the fourth embodiment is shown to have enlarger joining surface area than the first embodiment, the second and the third embodiments can also have enlarger joining surface area than that of the first embodiment.

In the fourth embodiment, a single optical fiber 3 inserted in the penetration bores 2, 2 is shown, however, plural optical fiber 3 can be inserted in the penetration bores, if necessary.

The space 18 may also be filled with a foamy organic material.

Figure 13:
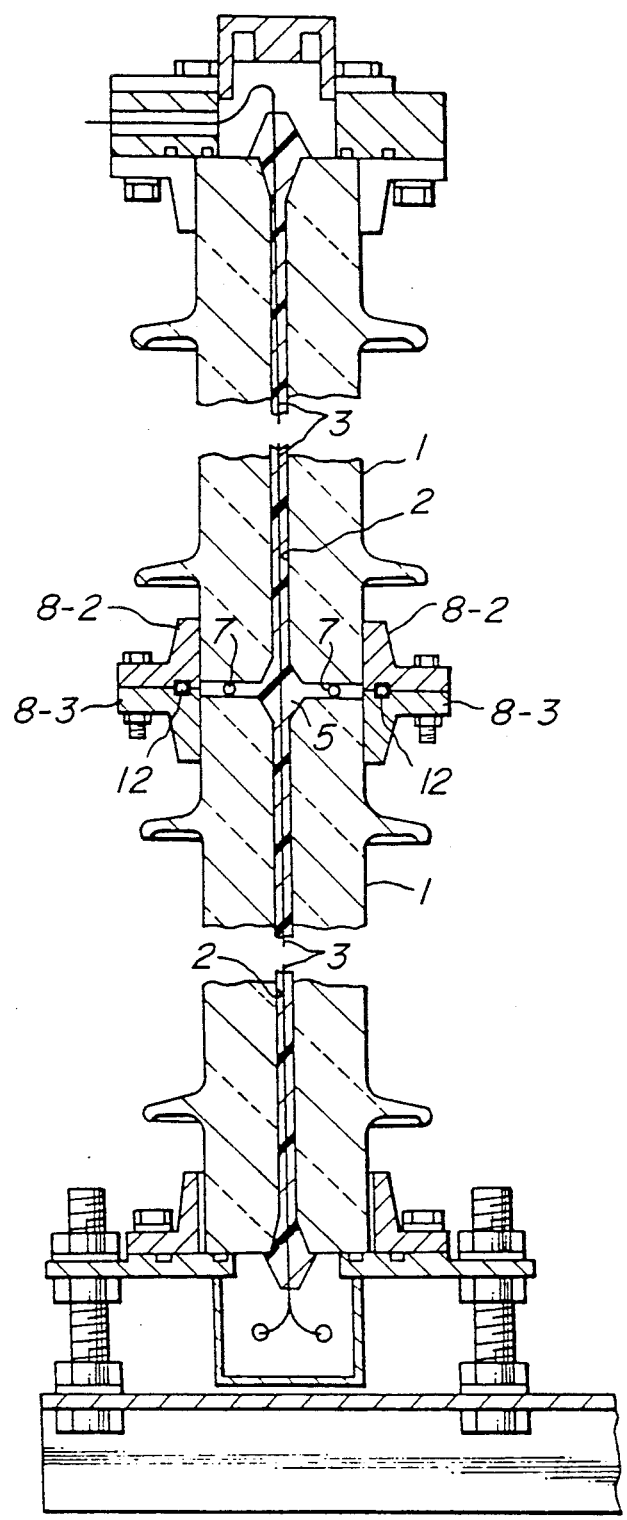
FIG. 13 is a schematic cross-sectional view of the first embodiment of the composite insulator of the sixth aspect of the present invention.
Figure 14:
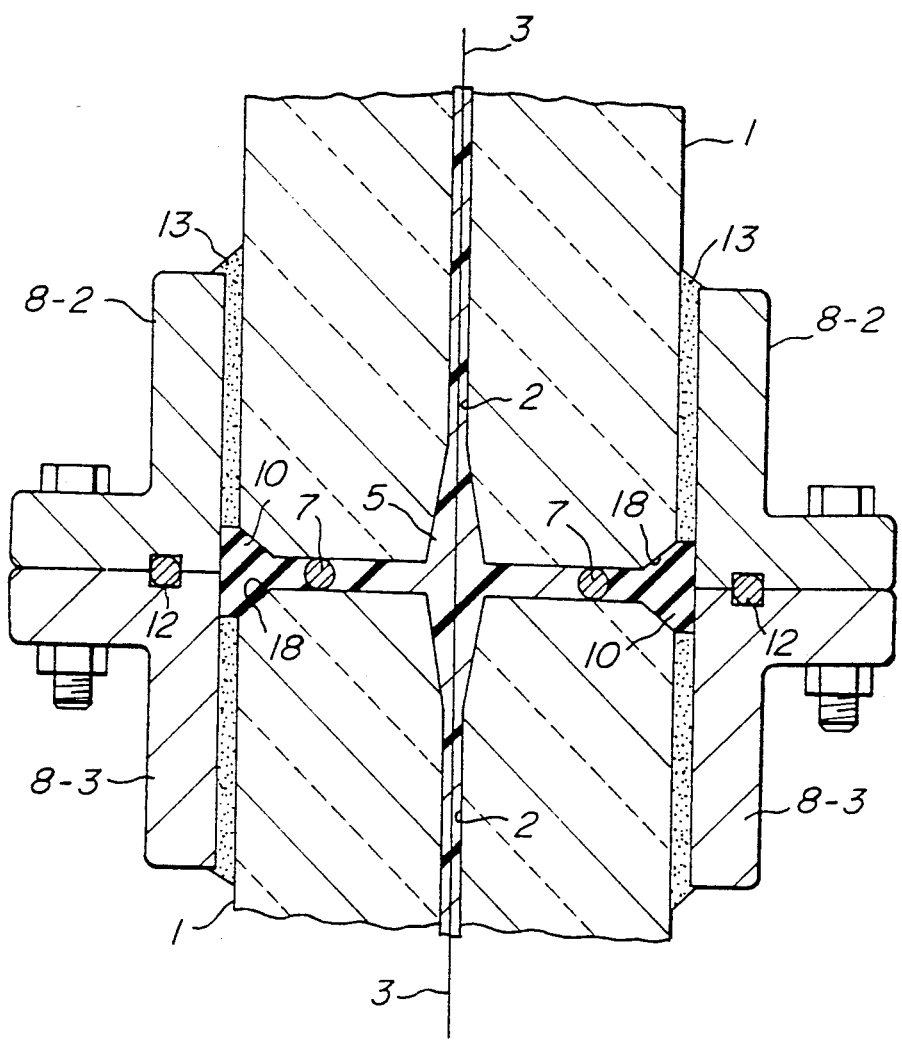
FIG. 14 is a schematic partial enlarged cross-sectional, view thereof.

Referring to FIGS. 13 and 14, an embodiment of the composite insulator of the sixth aspect of the present invention is shown, wherein the insulator bodies 1, 1 are connected in series with their opposing end surfaces being joined and clamped by the connector metallic fittings 8-2, 8-3. The optical fiber 3 inserted in the penetration bores 2, 2 is sealed by a sealing silicone rubber 5 filled in the interior of the penetration bores 2, 2. The silicone rubber 5 acts to prevent flowing of a leak current in the penetration bores 2, 2 caused by permeation of rain drops, etc., to the penetration bores 2, 2. The opposing end surfaces of the insulator bodies 1, 1 have tapered portions at the joining portion of the penetration bores 2, 2 similarly at the upper and lower end portions of the penetration bores for absorbing thermal expansion of the silicone rubber 5. Such tapered portions are to absorb an expansion of rubbers at the end portions and useful when using as a unit insulator body. Therefore, unit insulator bodies of a same kind can be used for the production of the composite insulator, so that a standardization of production steps can be realized. Meanwhile, when producing the composite insulator having a multiple insulator bodies, the penetration bore 2 of such insulator bodies may also be straight without having the tapered portions.

A sealing member O-ring 7 made of a resilient material is inserted between the opposing end surfaces of the insulator bodies 1, 1 to be joined, as shown in FIG. 14. The O-ring 7 has a larger diameter than that of the penetration bore 2 and is arranged to surround the penetration bore 2, and abuts resiliently on the opposing end surfaces of the insulator body 1, 1. A cement 13 is provided between the outer periphery of the opposing end surfaces of the insulator bodies and the connector metallic fittings to form a firm bonding therebetween and prevent a permeation of rain drops, etc., to the joining portion of the opposing end surfaces from the exterior. A packing 12 is arranged between the connector metallic fittings 8-2, 8-3. A highly viscous silicone 10 is filled in a space 18 defined by the metallic fittings 8-2, 8-3, the cement 13, the insulator bodies 1, 1 and the O-ring 7.

The composite insulator of the above structure having a multiple insulator bodies have the following functions.

By the presence of the O-ring 7, the silicone rubber 5 filled in the penetration bores 2, 2 having the inserted optical fiber 3 is not exposed to moisture permeated from the cement 13, so that withstanding insulative capability of the insulator bodies is not decreased and the problem of the deterioration of the silicone rubber 5 due to the moisture does not arise, even if the silicone rubber 5 happens to peel off from the insulator bodies 1, 1.

If the insulator bodies 1, 1 are thermally expanded at this state, the silicone rubber 5 is also thermally expanded. In such case usually the silicone rubber 5 has a larger thermal expansion coefficient than the insulator bodies 1, 1, so that there is a danger that the insulator bodies 1, 1 are destructed by thermal expansion of the silicone rubber 5 if they are left as they are. However, the O-ring 7 inserted between the opposing end surfaces of the insulator bodies 1, 1 is made of a resilient member, so that the O-ring 7 is expanded outwardly depending on thermal expansion of the silicone rubber 5, thus absorbing the thermal expansion of the silicone rubber 5 and obviating the destruction of the insulator bodies 1, 1.

In addition, even if rain drops, etc., are permeated between the opposing end surfaces of the insulator bodies 1, 1 through interstices of the cement 13 applied between the outer peripheral surface of the joining portion of the insulator bodies 1, 1 and the connector metallic fittings 8-2, 8-3, the rain drops, etc., are prevented by the O-ring 7 from reaching the penetration bores 2, 2, because the O-ring 7 inserted between the opposing end surfaces of the insulator bodies 1, 1 contacts resiliently with the opposing end surfaces of the insulator bodies 1, 1.

Therefore, a short-circuited trouble can be prevented from occurring by the preventing functions of the O-ring 7.

Moreover, the mechanical shocks which might be produced between the opposing end surfaces of the insulator bodies 1, 1 at the time of earthquake, etc., and which may destruct the opposing end surfaces of the insulator bodies 1, 1 by the confliction of the opposing end surfaces or the opposing end surfaces and the connector metallic fittings, if the opposing end surfaces or the opposing end surfaces and the metallic fittings are abutted and contacted directly to each other, can be absorbed by the O-ring 7 inserted and resiliently abutted between the opposing end surfaces of the insulator bodies 1, 1. Therefore, the opposing end surfaces of the joined insulator bodies 1, 1 do not conflict to each other, so that the insulator bodies 1, 1 are not destructed by mechanical shocks at the time of earthquake, etc.

By providing silicone 10, the sealings by the cement 13 and the O-ring 7 can be dispensed with, the permeation of moisture to the joining portion of the insulator bodies can be prevented, so that formation of cracks in the insulator bodies 1, 1 due to freezing of moisture in winter season can also be prevented.

Instead of silicone 10 used in this embodiment, a foamy urethane may be filled in the space 18 without using the O-ring 7. As a result, an elevation of inner pressure within the composite insulator due to expansion of the silicone rubber 5 at the time of temperature elevation of the composite insulator can be absorbed by the foamy urethane, and permeation of moisture into the composite insulator from the exterior can be prevented.

Figure 15:
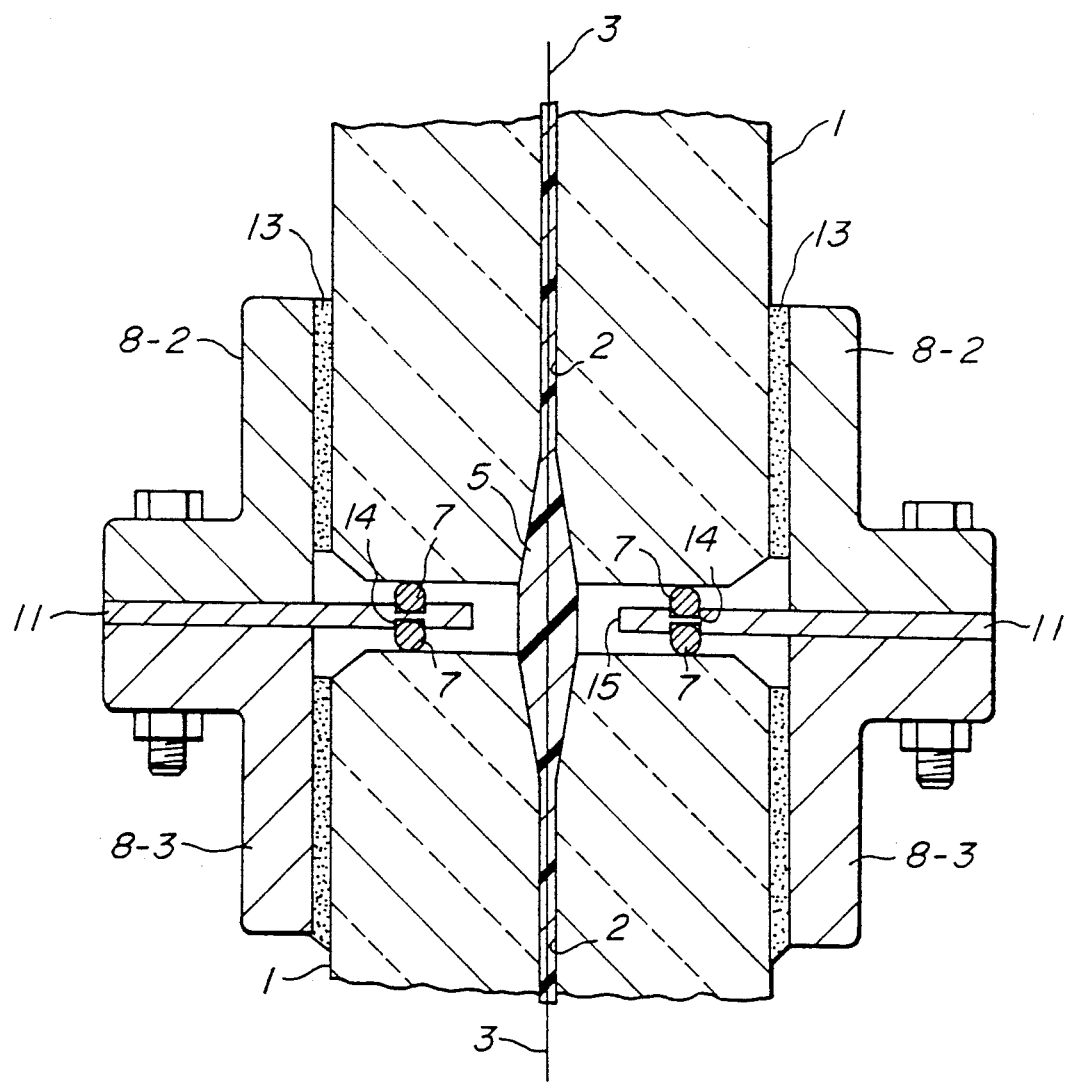
FIG. 15 is a schematic partial enlarged cross-sectional view of the second embodiment of the composite insulator of the sixth aspect of the present invention.

Referring to FIG. 15, a second embodiment of the sixth aspect of the present invention is shown, wherein a disc-shaped spacer has at its central axis portion a perforation hole 15 of a same shape as that of the penetration bore 2 of the insulator body 1, and circular grooves 14, 14 surrounding the penetration bore 2 on the front and rear side thereof and receiving respectively an O-ring 7 made of a resilient material. The O-ring 7 are fitted in the circular grooves 14 with their upper portions being exposed to resiliently abut on the opposing end surfaces of the insulator bodies 1, 1.

In this second embodiment of the sixth aspect of the present invention, the spacer 11 is present between the opposing end surfaces of the insulator bodies 1, 1 in addition to the first embodiment of the sixth aspect, so that the confliction and the destruction of the opposing end surfaces are securely prevented, even if an excessive load is exerted on the upper insulator body 1. The spacer in the composite insulator can be adjusted in thickness, so that precise dimensions of the insulator bodies and the connector metallic fittings are not necessary and the assembling thereof is facilitated.

Though a single optical fiber 3 is used and inserted in the first and the second embodiments, a plural number of the optical fibers 3 may be used, if necessary.

Figure 16:
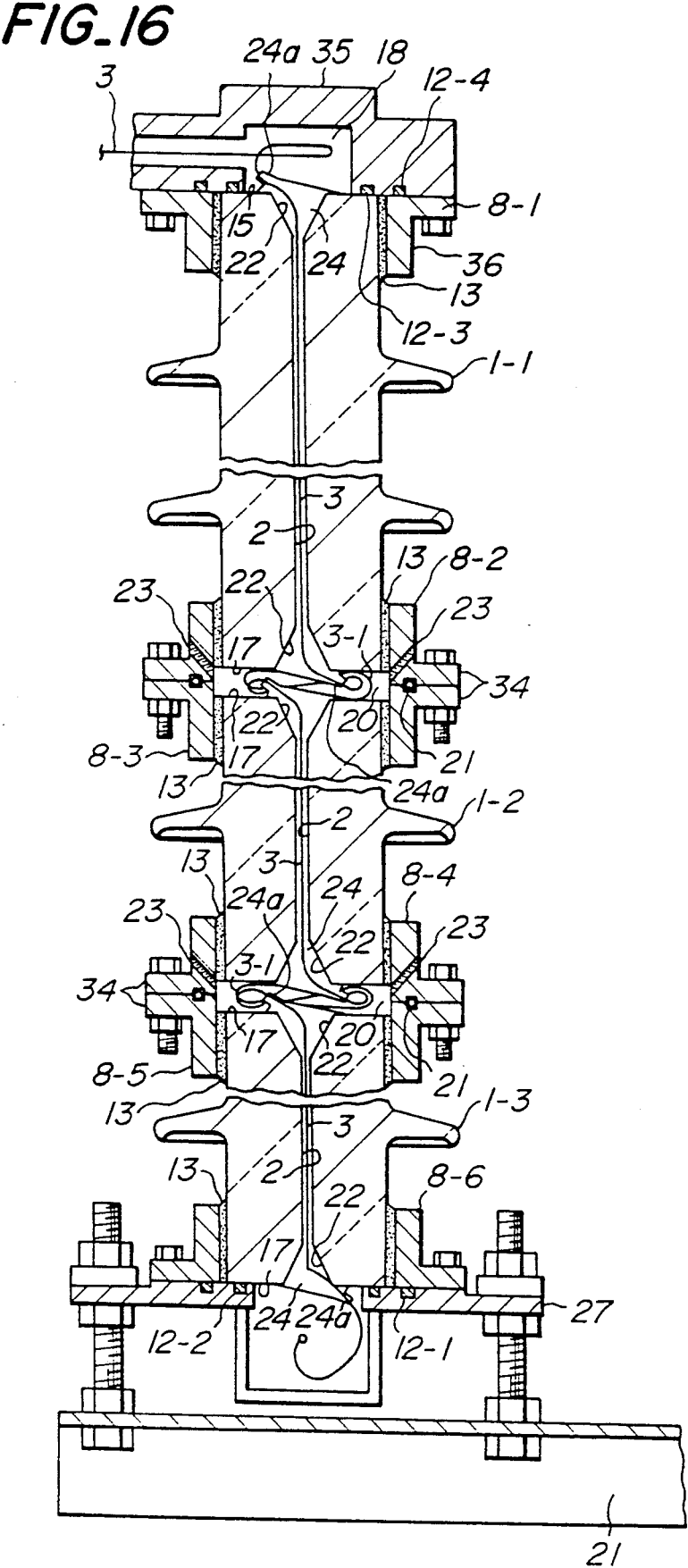
FIG. 16 is a schematic partial enlarged cross-sectional view of another example of the composite insulator of the present invention, showing the joining portion of the insulator bodies.
Figure 17:
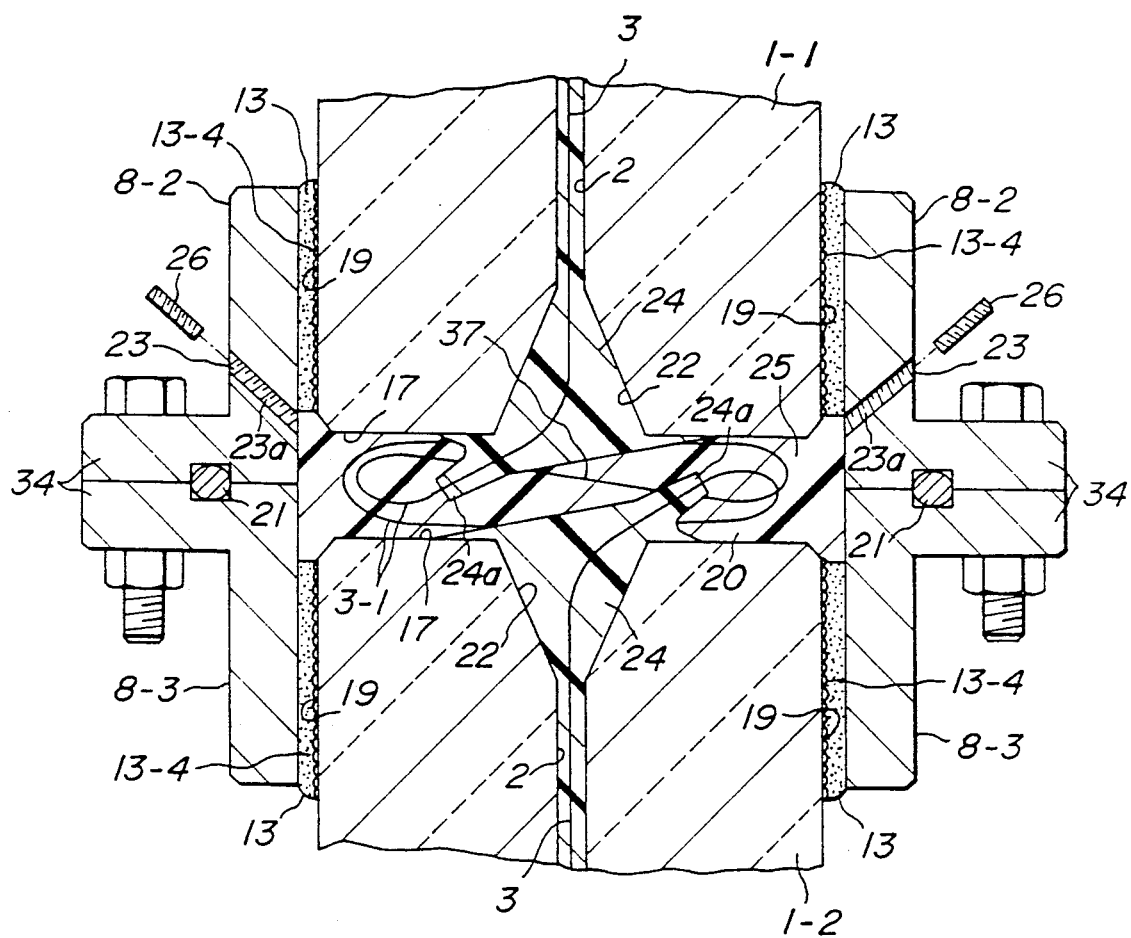
FIG. 17 is a schematic cross-sectional view of an example of the composite insulator of the present invention having stacked and joined three insulator bodies.
Figure 18:
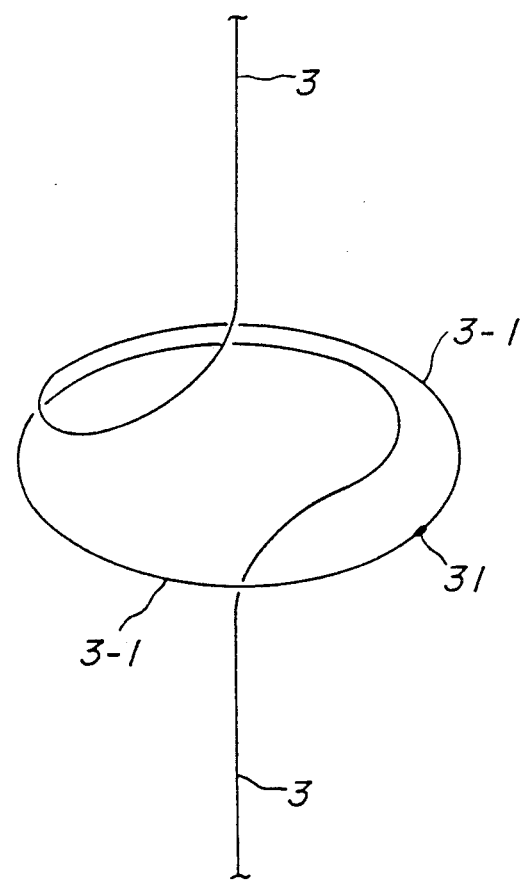
FIG. 18 is an explanatory view showing a state of the remaining portions of the optical fibers extended spirally from the penetration bores and the end surfaces of the optical fibers are joined to each other.

Referring to FIGS. 16, 17, an embodiment of the composite insulator of other aspects of the present invention is shown, wherein three insulator bodies 1-1, 1-2, 1-3 having penetration bores 2 for inserting the optical fiber 3 are stacked in series on a packing 21. Corresponding to the lower end surface 17 of the lowest insulator body 1-3, a seating plate 27 is mounted on the packing 21 in a height adjustable fashion by adjust bolts and nuts. A support ring 18 is fixed on the seating plate 27 via a packing 12-1.

The lower end portion of the insulator body 1-3 is fitted in the central portion of the support ring 18, and the lower periphery of the insulator body 1-3 is fixed by a cement 13, while a packing 12-2 is inserted between the lower end surface 15 of the insulator body 1-3 and the seating plate 27.

The upper end surface 15 of the insulator body 1-1 and a support ring 36 fixed on the upper portion of the insulator body 1-1 support a cap 35 having a cavity 31 for receiving an extended portion of the optical fiber 3. The cap 35 is connected and fixed to the insulator body 1-1 and the support ring 36 via packings 12-3, 12-4.

Flange type connector metallic fittings 8-2 through 8-5 are arranged on the lower end portion of the insulator body 1-1, the upper and lower end portions of the insulator body 1-2, and the upper end portion of the insulator body 1-3, and fixed by the cement 13. The opposing end surfaces of the insulator bodies are positioned in recessed levels relative to the joined end surfaces of the flange type connector metallic fittings 8-2 through 8-5 and fixed by the cement 13. The insulator bodies are clamped and fixed by the flange type metallic fittings 8-2 through 8-5 by means of bolts and nuts. Sands 13-4 are adhered on the outer peripheral surfaces of the end portions of the insulator bodies for improving the joining strength of the metallic fittings and the insulator bodies. A joining surface area of a joint portion 19 at the end portions of the insulator bodies on which sands 13-4 are adhered is preliminarily determined to lie within a range that the insulator body can withstand a mechanical strength exerted thereon.

Therefore, joining portions 20 are formed in the spaces between the opposing end surfaces of the insulator bodies 1-1, 1-2 and 1-3. The joining portions 20 are filled with a gelatinous silicone 25 as an insulation material. The gelatinous silicone 25 prevents rain drops, etc., from entering in the penetration bores 2, 2 through the joining portion 20 of the insulator bodies 1, 1, so that a short circuited trouble can be obviated. In this case, the packing 21 may be dispensed with.

The packing 21 is disposed between the abutting surfaces of the flanges 34 of the metallic fittings 8-2 through 8-5 for maintaining an airtight sealing of the abutting surfaces of the flanges 34. In addition, the metallic fittings 8-2, 8-4 fixed on the lower end portions of the insulator bodies 1-1, 1-2 have at their side surfaces plural inwardly inclined oblique inlet holes 23 which communicate with the joining portions 20, and female threads 23a for threadedly engaging with tap screws 26 serving as sealing plugs. A sufficient sealing effect can also be attained by merely introducing an organic material in the inlet holes 23 up to the upper ends thereof.

Both ends of the penetration bores 2, 2 bored in the insulator bodies 1, 1 have respectively a tapered portion 22 which assures a permissible minimum bending radius of the optical fiber 3. An organic material, such as, silicone rubber 24 is filled in the penetration bores 2, 2 as a sealant to fix the optical fiber 3 inserted in the penetration bores 2, 2.

Figure 21:
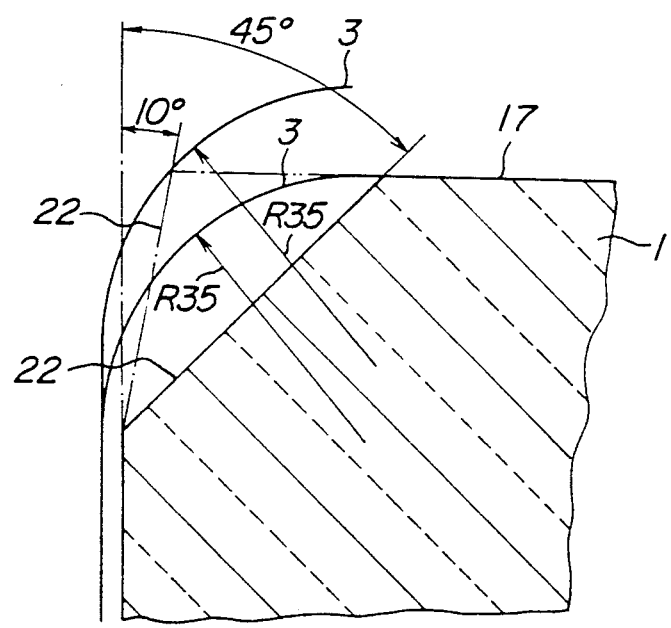
FIG. 21 is a schematic partially enlarged cross-sectional view of the tapered portion of the insulator body of the composite insulator of the present invention, showing an extent of the tapered angle of the tapered portion.

The tapered portion 22 has a purpose of mitigating an expansion of the silicone rubber 24 at high temperatures which seals the optical fiber 3, and a purpose of drawing the optical fiber 3 while pertaining the bending radius thereof from the center, in order to minimize the height of the joining portion 20, as shown in FIG. 21. For the purpose of drawing the optical fiber 3, an angle of 45° of the tapered portion 22 is most preferable from the depth of the minimum bending radius of the optical fiber 3, and an angle of at least 10° of the tapered portion 22 is desirable for the purpose of mitigating the thermal expansion of the silicone rubber 24.

The extended portion 3-1 of the optical fiber 3 is guided spirally by the silicone rubber 24 approximately from the tapered portion 22 while pertaining the permissible minimum bending radius, and introduced from an outlet 24a of the silicone rubber 24 to the interior of the joining portion 20. The outlet 24a is formed in such a fashion that it and the opposing outlet 24a of the silicone rubber 24 across the joining portion 20 are directed to an opposite direction to each other so that they do not interfere with each other.

The extended portion 3-1 of the optical fiber 3 has to be wound and accommodated in the joining portion 20 while pertaining a radius of at least 35 mm. The extended portion 3-1 can be preliminarily inserted in a spiral pipe having a radius of 35 mm, to reduce extensively the working time required for assembling the composite insulator.

The extended portions 3-1 of the optical fibers 3, 3 extended from the outlets 24a, 24a, are abutted to each other at their end surfaces, and melt bonded to form a joint 37. The end surfaces of the optical fibers 3, 3 can be bonded by an optical connector for facilitating the assembling of the composite insulator in the field.

Hereinafter, a method of producing or assembling the composite insulator of the present invention will be explained.

At first, the optical fiber 3 with the extended portion 3-1 is inserted in the penetration bore 2 of the unit insulator body 1 so as to extend the extended portion 3-1 from the penetration bore 2, and the optical fiber 3 is fixed in the penetration bore. Then, connector metallic fittings 8-1 through 8-6 are arranged and fixed on the outer peripheral end surface of respective insulator body 1 by cement 13 such that the end surface 17 of the insulator body 1 positions a lower or recessed level than the surface of a flange 34 of the metallic fittings to be abutted.

Subsequently, in order to provide the outlet 24a on the end surface 18 of the insulator body 1, a jig which maintains the extended portion 3-1 spirally while pertaining a permissible minimum bending radius thereof is abutted on the end surface 17. Thereafter, the silicone rubber 24 is filled in the penetration bore 2 and the tapered portion 22 to integrally form the outlet 24a and fix the optical fiber 3 and the extended portion 3-1.

Further, the extended portions 3-1 of the optical fibers 3 are abutted and melt bonded to each other, and accommodated spirally in the joining portion 20. The insulator bodies 1, 1 are disposed relatively such that their outlet 24a do not interfere with each other. The O-ring 21 is inserted between the flanges 34 of the connector metallic fittings 8-2 through 8-5, and the opposing flanges 34 are abutted to each other and clamped and fixed by bolts and nuts.

Next, the joined insulator bodies 1-1, 1-2, 1-3 are arranged upright, and the gelatinous silicone 25 is filled in the joining portion 20 from the inlet 23 which is then sealed by the tap screw 26 fitted therein. These insulator bodies 1-1, 1-2, 1-3 are arranged upright on the seating plate 27, and fixed by the connector metallic fitting 8-6 at the lower end of the insulator body 1-3.

Thus, the optical fiber 3 is inserted in the penetration bore 2 of the insulator body 1 with the extended portion 3-1 being spirally extended or introduced from the penetration bore 2. The extended portions 3-1 of the insulator bodies 1 are fixed by the silicone rubber 24. Therefore, the sealing can be effected on respective insulator body 1, so that the production plant can be made small, and the composite insulator can be assembled in the field.

Because the extended portions 3-1 of the optical fiber 3 are spirally introduced or extended from the penetration bores 2, an excessive bending stress is not exerted on the optical fiber 3 when it is introduced in the joining portion 20, so that the optical fiber 3 can be protected from breakage.

Because the gelatinous silicone 25 is filled in the joining portion 20, the permeation of rain drops, etc., to the penetration bore 2 receiving an inserted optical fiber 3 through the interstices of the cement 13 can be prevented, so that troubles of short circuiting to the ground can be prevented.

Because the tapered portions 22 are formed on the end portions of the penetration bores 2, a permissible minimum bending radius of extended portion 3-1 can be maintained, so that the extended portion 3-1 of the optical fiber 3 needs not be forcibly bonded, and hence the breakage of the optical fiber 3 can be prevented.

The height and the number of the insulator bodies 1-1, 1-2, 1-3 can be varied freely depending on the use of the composite insulator.

Because the extended portions 3-1 of the optical fiber 3 are received in the joining portion 20, the extended portions 3-1 absorb contrary to conventional composite insulators an excessive strain exerted on the insulator bodies 1-1, 1-2, 1-3 from horizontal direction, even if such stress is exerted, so that the optical fiber 3 is prevented from breakage.

Because the joining portions 20 are formed when stacking a multiple number of the insulator bodies, the opposing end surfaces 17, 17 do not interfere or conflict with each other, even when the insulator bodies 1-1, 1-2, 1-3 are thermally expanded, so that the breakage of the insulator bodies 1-1, 1-2, 1-3 can be prevented.

Because the oblique inlets 23 are formed on the side wall of the connector metallic fittings 8-2, the gelatinous silicone 25 can be easily introduced in the joining portion 20 after the assembling of the composite insulator. Exchange and make up of the silicone 25 can also be effected easily through the oblique inlets 23.

Though the silicone rubber 24 is used as a sealant in this embodiment, other sealant may be used such as a resilient organic material or synthetic rubber.

Though the gelatinous silicone 25 is used in the joining portions 20, an insulative foamy urethane, foamy silicone or organic material, etc., may be used instead of the silicone 25.

Though the insulator bodies 1-1, 1-2, 1-3 having the connector metallic fittings 8-2 through 8-5 arranged thereon are joined by the flanges 34 of the metallic fittings 8-2 through 8-5 such that the end surfaces 17 of the insulator bodies are recessed or existing at a lower level than the level of the joined surfaces of the flanges 34 to form the joining portions 20 in this embodiment, other constructions may also be adopted as follows.

Figure 19:
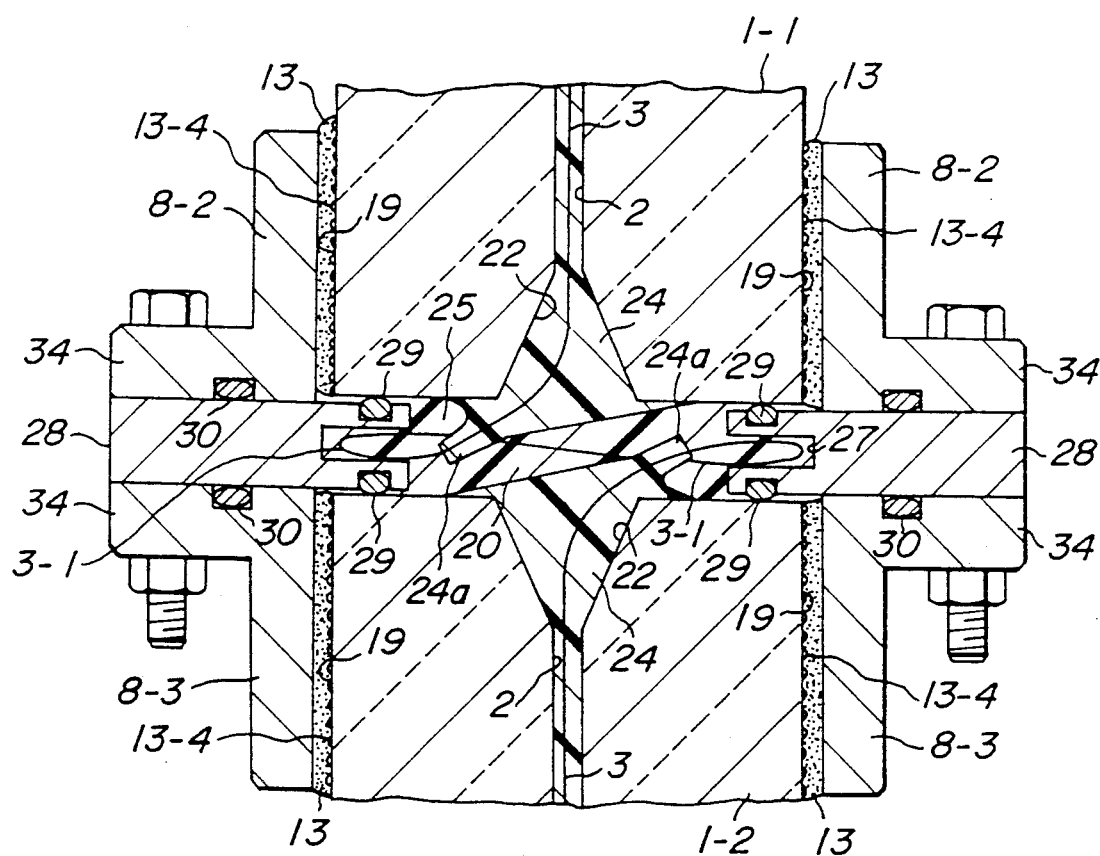
FIG. 19 is a schematic partially enlarged cross-sectional view of another example of the composite insulator of the present invention.

A spacer ring 28 having a circular receiving recess 27 on the inner peripheral wall thereof is inserted between the opposing end surfaces of the insulator bodies 1-1, 1-2, and O-rings 29 are disposed on both the surfaces of the spacer 28 such that the O-rings 29 abut on the end surfaces 17 of the insulator bodies 1-1, 1-2, to form the joining portion of a sealed structure, while packings 30 are disposed on both surfaces of the spacer 28 between the flanges 34 of the connector metallic fittings 8-2, 8-4 such that the packings 30 abut on the flanges 34, to maintain the airtight structure of the flanges 34, as shown in FIG. 19.

As a result, the opposing end surfaces of the flange 34 of the connector metallic fittings 8-2, 8-3 can have substantially the same levels with those of the opposing end surfaces 17 of the insulator bodies 1-1, 1-2.

Figure 20:
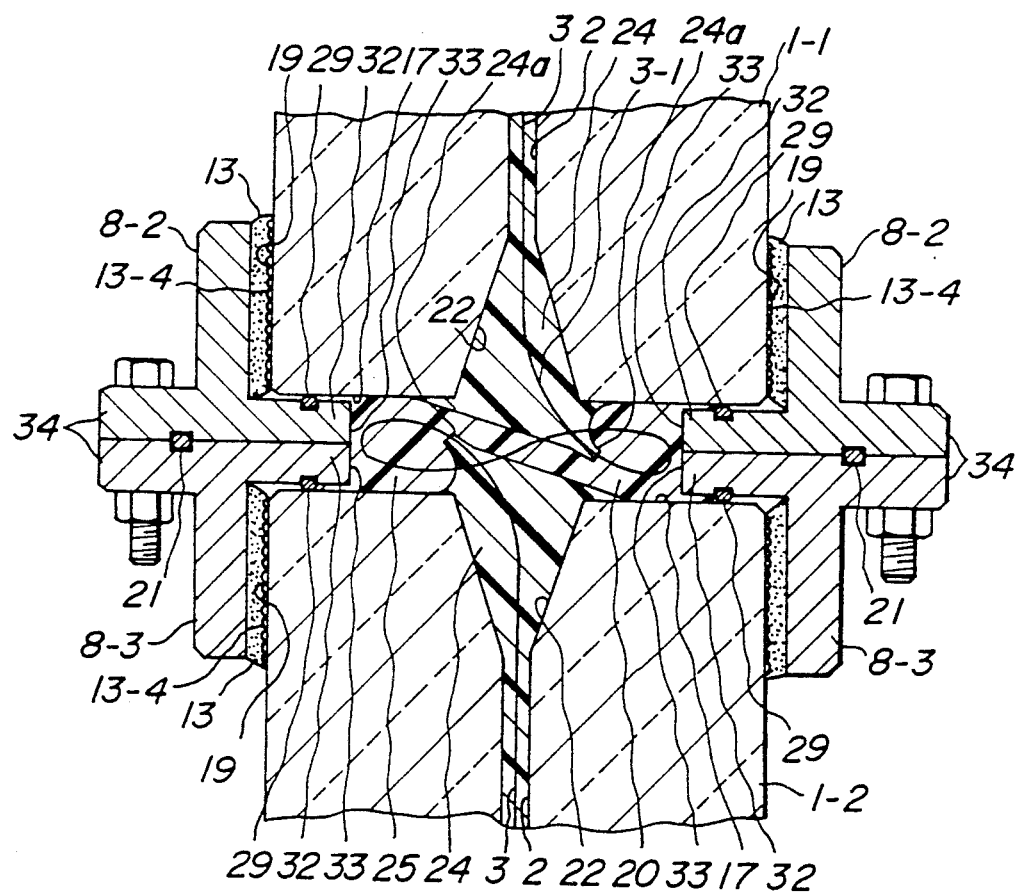
FIG. 20 is a schematic partially enlarged cross-sectional view of an example of the composite insulator of the present invention, showing an example of the connector metallic fitting.

In addition, the flanges 34 of the connector metallic fittings 8-2, 8-3 can have circular projections 32 inwardly projected from the flanges 34 for supporting the optical fiber 3, and perforation holes 33 for a minimum bending radius of the optical fiber 3, as shown in FIG. 20.

As a result, the spacer 28 needs not be inserted, so that the parts and elements required for assembling the composite insulator can be reduced, and the joining surfaces can be reduced, so that the sealing effect can be improved. In addition, the insulator bodies 1-1, 1-2 are supported by the circular projections 32, so that the mechanical strength of the composite insulator can be improved.

Though a single optical fiber 3 was used in this embodiment, plural optical fibers 3 can also be used, if necessary.

As apparent from the foregoing explanations, the leakage of inner silicone grease to the exterior of the composite insulator through the sealings can effectively be prevented either by improving the sealing structure of the upper and lower end portions of the penetration bore of the insulator body according to the first aspect of the present invention, by improving the structure of the joining portion of the stacked insulator bodies according to the second aspect of the present invention, and by combining the first and second aspects according to the third aspect of the present invention.

The leakage of the inner silicone rubber to the exterior of the composite insulator through the seal, the bending of the optical fiber, and the breakage of the optical fiber can be prevented effectively by providing tapered portions at the upper and lower end portions of the penetration bore, sealing the penetration bore by a silicone rubber after insertion of the optical fiber, and providing the spacer at the boundary of the stacked insulator bodies for fixing the optical fiber, according to the fourth aspect of the present invention.

According to the fifth aspect of the present invention, the following advantageous effects can be attained.

Because the opposing end surfaces of the insulator bodies are sealed by the bonding material, rain drops, etc., are prevented from entering into the penetration bores from the exterior through the opposing end surfaces, so that current leakage and short circuited troubles of the composite insulator can be prevented.

If a resinous bonding material is used as a bonding material, the insulator bodies are easily bonded to each other. Meanwhile, if an inorganic material is used as a bonding material and heated to be sintered for sealing the insulator bodies, the joining strength of the opposing end surfaces of the insulator bodies can be maintained firmly for a long period.

If the spacer made of a material having substantially the same thermal expansion coefficient as that of the insulator body is inserted between the opposing end surfaces of the insulator bodies with an inorganic material applied on the spacer and on the opposing end surfaces and electrodes are attached on the spacer and an electric current is applied on the electrodes across the spacer, the inorganic material is sintered assuredly between the opposing end surfaces and around the penetration bores, so that the joining strength of the opposing end surfaces of the insulator bodies can be improved further.

If the sealing material filled in the penetration bores is exuded or leaks between the opposing end surfaces of the insulator bodies due to thermal expansion, such exudate is absorbed by the space between the opposing end surfaces of the insulator bodies, so that the destruction of the insulator bodies can be prevented.

In addition, because the opposing end surfaces of the insulator bodies have a larger diameter than that of the body portion of the insulator bodies, the opposing end surfaces of the insulator bodies can be joined with a large surface area, so that the joining strength of the opposing end surfaces of the insulator bodies can be improved further.

According to the sixth aspect of the present invention, the following advantageous effects can be attained.

Because plural insulator bodies having the penetration bore for inserting the optical fiber are joined to each other and the hermetically sealing member surrounding the penetration bore and resiliently abutting on the opposing end surfaces of the insulator bodies is disposed between the opposing end surfaces of the insulator bodies to be joined, the hermetically sealing member of an expanded diameter absorbs thermal expansion of the sealing material, even if the sealing material is exuded and thermally expanded between the opposing end surfaces of the insulator bodies, so that destruction of the insulator bodies can be prevented. Even if raindrops, etc., is permeated between the opposing end surfaces of the insulator bodies from the exterior, the hermetically sealing member prevents the permeated raindrops, etc., from reaching the penetration bore, so that short circuited troubles can be prevented. Besides, the mechanical shocks which might be produced between the opposing end surfaces of the insulator bodies at the time of earthquake can be absorbed by the hermetically sealing member to prevent confliction of the opposing end surfaces of the insulation bodies to each other, so that the destruction of the insulator bodies can be prevented.

According to the seventh aspect of the present invention, the insulator body can be produced as a unit, so that the assembling work can be performed in the field, and the height of the composite insulator of multiple stacked insulator bodies can be varied depending on the use of the composite insulator.

According to the eighth aspect of the present invention, the joining portion can be easily formed by inserting the spacer ring in the joining portion of the insulator bodies, so that the production of the composite insulator can be facilitated.

According to the ninth aspect of the present invention, the joining portion for accommodating the extended portion of the optical fiber can be easily formed and the joining portion can receive or accommodate the optical fiber while pertaining a minimum bending radius, so that the optical fiber can be prevented from breakage.

According to the tenth aspect of the present invention, the extended portion of the optical fiber is introduced spirally into the joining portion by the sealing material without being exerted by an excessive bending stress, so that the optical fiber can be prevented from breakage.

According to the eleventh aspect of the present invention, the joining portion is filled with an insulative material to prevent easy permeation of moisture in the penetration bore of the insulator body, so that short circuited troubles of the composite insulator can be prevented.

According to the twelfth aspect of the present invention, the tapered portions securing a permissible minimum bending radius are formed at the penetration bores of the insulator bodies and the extended portion of the optical fiber is not subjected to an excessive bending stress, so that the optical fiber can be prevented from breakage.

According to the thirteenth aspect of the present invention, the connector metallic fittings form the joining portion assuring the minimum bending radius of the optical fiber so as not to exert an excessive bending stress on the optical fiber, so that the optical fiber is prevented from breakage. In addition, the mechanical strength of the insulator bodies can be assured by the joint portion or the supporting projected portion of the flanges of the metallic fittings.

Although the present invention has been explained with reference to specific values and embodiments, it is of course apparent to those skilled in the art that various variations and modifications are possible without departing from the broad spirit and aspect of the present invention as defined in the appended claims.

What is claimed is:

1. An optical fiber built-in type composite insulator, comprising:
    an insulator body having a penetration bore in a central axis portion thereof;
    at least one optical fiber inserted in the penetration bore;
    silicone grease sealingly filled in the penetration bore in a middle portion of the insulator body;
    silicone rubbers sealingly filled in the upper and lower end portions of the penetration bore; and
    corrosion resistant partition walls arranged in the penetration bore between the silicone grease and the silicone rubbers.

2. The insulator of claim 1, further comprising porous rubbers arranged in the penetration bore between the silicone grease and each of the partition walls.

3. An optical fiber built-in type composite insulator, comprising:
    at least two joined insulator bodies, stacked so that each penetration bore in a central axis portion thereof is aligned;
    at least one optical fiber inserted in each said penetration bore;
    flange type connector metallic fittings joined to the insulator bodies so as to connect each said penetration bore;
    a silicone grease sealingly filled in each said penetration bore in a middle portion of each of the insulator bodies; and
    duel O-rings arranged at joined portions of the insulator bodies and having silicone rubber sealingly filled therebetween, wherein at least an inside O-ring of the duel O-rings is constituted by a material which is stable to the silicone grease.

4. The insulator of claim 3, further comprising at least one spacer provided at the joined portions of the insulator bodies which fixedly positions the optical fiber.

5. An optical fiber built-in type composite insulator, comprising:

at least two joined insulator bodies, stacked so that each penetration bore in a central axis portion thereof is aligned;

at least one optical fiber inserted in each said penetration bore;

flange type connector metallic fittings joined to the insulator bodies for airtightly connecting the insulator bodies to each other;

a silicone grease sealingly filled in each said penetration bore in a middle portion of each of the insulator bodies;

silicone rubbers sealingly filled in upper and lower end portions of each said penetration bore;

corrosion resistant partition walls arranged between the silicone grease and the silicone rubbers; and duel O-rings arranged at joined portions of the insulator bodies and having silicone rubber sealingly filled therebetween, wherein at least an inside O-ring of the dual O-rings is constituted by a material stable to the silicone grease.

6. An optical fiber built-in type composite insulator, comprising:

at least two joined insulator bodies each having a penetration bore in a central axis portion thereof, said insulator bodies being stacked such that each said penetration bore is aligned;

at least one optical fiber inserted in each said penetration bore; and a bonding material arranged in a space between opposing end surfaces of the insulator bodies for sealing the insulator bodies together, wherein the bonding material consists of an inorganic bonding material which is heat treated for the sealing.

7. An optical fiber built-in type composite insulator, comprising:

at least two joined insulator bodies each having a penetration bore in a central axis portion thereof, said insulator bodies being stacked such that each said penetration bore is aligned;

at least one optical fiber inserted in each said penetration bore;

a bonding material arranged in a space between opposing end surfaces of the insulator bodies for sealing the insulator bodies together, the bonding material consisting of an inorganic bonding material which is heat treated for the sealing; and a spacer disposed between the opposing end surfaces of the insulator bodies at a portion corresponding to each said penetration bore, the spacer being formed of a material having substantially the same thermal expansion coefficient as that of the insultator bodies and having a perforation of a diameter larger than that of each said penetration bore.

8. An optical fiber built-in type composite insulator comprising:

at least two joined insulator bodies each having a penetration bore in a central axis portion thereof, said insulator bodies being stacked such that each said penetration bore is aligned;

at least one optical fiber inserted in each said penetration bore;

a bonding material arranged in a space between opposing end surfaces of the insulator bodies for sealing the insulator bodies together, the bonding material consisting of an inorganic bonding material which is heat treated for the sealing; and a sealing material filled in each said penetration bore for fixing the optical fiber therein, wherein a space is formed between the bonding material and the sealing material for absorbing thermal expansion of the sealing material.

9. An optical fiber built-in type composite insulator, comprising:

at least two joined insulator bodies each having a penetration bore in a central axis portion thereof, said insulator bodies being stacked such that each said penetration bore is aligned;

at least one optical fiber inserted in each said penetration bore; and a bonding material arranged in a space between opposing end portions of the insulator bodies for sealing the insulator bodies together, the bonding material consisting of an inorganic bonding material which is heat treated for the sealing;

wherein the opposing end portions of the insulator bodies have a diameter larger than that of body portions of the insulator bodies.

10. An optical fiber built-in type composite insulator, comprising:

at least two joined insulator bodies, stacked so that each penetration bore in a central axis portion thereof is aligned;

at least one optical fiber inserted in each said penetration bore; and an hermetically sealing member arranged between opposing end surfaces of the insulator bodies which surrounds each said penetration bore and resiliently abuts the opposing end surfaces of the insulator bodies, the hermetically sealing member consisting of O-rings attached on both sides of a spacer inserted between the opposing end surfaces of the insulator bodies, the spacer having a perforation at a portion corresponding to each said penetration bore of a diameter smaller than the diameter of the O-rings and larger than the diameter of each said penetration bore.

11. An optical fiber built-in type composite insulator, comprising:

at least two joined insulator bodies each having a penetration bore in a central axis portion thereof, said insulator bodies being stacked such that each said penetration bore is aligned;

at least one optical fiber inserted in each said penetration bore; and at least one space formed between opposing end surfaces of the insulator bodies for serving as at least one joining portion, each joining portion receiving a spiral extended portion of the optical fiber extending from each said penetration bore, the spiral extended portion of the optical fiber being joined at opposing end surfaces thereof in the joining portion;

wherein a gelatinous, foamy or rubbery sealing material is filled in each said penetration bore for fixing the optical fiber, the spiral extended portion of the optical fiber being guided in the joining portion by the sealing material.

12. An optical fiber built-in type composite insulator, comprising:

at least two joined insulator bodies each having a penetration bore in a central axis portion thereof, said insulator bodies being stacked such that each said penetration bore is aligned;

at least one optical fiber inserted in each said penetration bore;

at least one space formed between opposing end surfaces of the insulator bodies for serving as at least one joining portion, each joining portion receiving an extended portion of the optical fiber extending from each said penetration bore, the extended portion of the optical fiber being joined at opposing end surfaces thereof in the joining portion;

a gelatinous, foamy or rubbery sealing material filled in each said penetration bore for fixing the optical fiber, the optical fiber being guided spirally in the joining portion by the sealing material; and a connector metallic fitting having a perforation and being fixed on outer peripheral surfaces of opposing end portions of the insulator bodies by fixing opposing surfaces of flanges of the connector metallic fitting such that the opposing surfaces of the flanges of the connector metallic fitting protrude from the opposing end surfaces of the insulator bodies, wherein the connector metallic fitting and the insulator bodies define the joining portion such that the space of the joining portion has a radius larger than a minimum bending radius of the optical fiber and assures accommodation of the optical fiber therein.

13. The insulator of claim 12, wherein the connector metallic fitting has an inwardly projected protrusion which defines the perforation, and separates and supports the opposing end portions of the insulator bodies, the protrusion of the metallic fitting and the opposing end surfaces of the insulator bodies being airtightly fixed to each other.

14. The insulator of claim 12, wherein a surface area of fixing the metallic fitting on the outer peripheral surfaces of the opposing end portions of the insulator bodies is equal to or larger than a surface area of stacked insulator bodies without a spacing therebetween, such that a mechanical strength of the insulator bodies is at least equal to a mechanical strength of the insulator bodies without the spacing therebetween.

* * * * *